United States Patent
Sato et al.

(10) Patent No.: US 12,186,666 B2
(45) Date of Patent: *Jan. 7, 2025

(54) NON-TRANSITORY COMPUTER-READABLE STORAGE MEDIUM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Shintaro Sato, Kyoto (JP); Kenji Matsumoto, Kyoto (JP); Shinya Nakagawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,162

(22) Filed: Aug. 23, 2023

(65) Prior Publication Data

US 2024/0009570 A1    Jan. 11, 2024

Related U.S. Application Data

(63) Continuation of application No. 17/584,118, filed on Jan. 25, 2022, now Pat. No. 11,771,991.

(30) Foreign Application Priority Data

Feb. 15, 2021 (JP) ................................ 2021-021912
Feb. 15, 2021 (JP) ................................ 2021-021913

(51) Int. Cl.
*A63F 13/56* (2014.01)
*A63F 13/42* (2014.01)
(Continued)

(52) U.S. Cl.
CPC .............. *A63F 13/56* (2014.09); *A63F 13/42* (2014.09); *A63F 13/69* (2014.09); *A63F 13/837* (2014.09)

(58) Field of Classification Search
CPC .......... A63F 13/56; A63F 13/42; A63F 13/69; A63F 13/837
See application file for complete search history.

(56) References Cited

U.S. PATENT DOCUMENTS 5,734,373 A * 3/1998 Rosenberg ............. A63F 13/285
                                                          345/161
5,857,986 A * 1/1999 Moriyasu ............... A61H 23/02
                                                          601/57
(Continued)

FOREIGN PATENT DOCUMENTS

EP       1 002 562       5/2000
JP      2000-153062      6/2000
(Continued)

OTHER PUBLICATIONS

Jan. 18, 2024 Office Action issued in Japanese Patent Application No. 2021-021912, pp. 1-2 [machine translation included].
(Continued)

*Primary Examiner* — David L Lewis
*Assistant Examiner* — Matthew D Hoel
(74) *Attorney, Agent, or Firm* — Nixon & Vanderhye PC

(57) ABSTRACT

In an example of an information processing system, in a case where a user character is present on an area in a first state on a wall surface, and while an input to an operation button is continued, the user character is caused to perform a preliminary action, and if at least the input to the operation button ends, the user character is moved to a boundary between the area in the first state and another area on the wall surface. If the user character reaches the boundary, the user character is caused to jump from the boundary.

17 Claims, 22 Drawing Sheets

(51) Int. Cl.
*A63F 13/69* (2014.01)
*A63F 13/837* (2014.01)

(56) References Cited

U.S. PATENT DOCUMENTS

| | | | |
|---|---|---|---|
| 5,897,437 A * | 4/1999 | Nishiumi | A63F 13/24 |
| | | | 463/47 |
| 5,999,168 A * | 12/1999 | Rosenberg | G06F 3/016 |
| | | | 345/161 |
| 6,001,014 A * | 12/1999 | Ogata | A63F 13/285 |
| | | | 463/37 |
| 6,072,467 A * | 6/2000 | Walker | G06F 3/0346 |
| | | | 345/157 |
| 6,147,674 A * | 11/2000 | Rosenberg | G05G 9/047 |
| | | | 345/157 |
| 6,679,776 B1 * | 1/2004 | Nishiumi | G06F 3/016 |
| | | | 463/36 |
| 6,864,877 B2 * | 3/2005 | Braun | G06F 3/016 |
| | | | 715/702 |
| 7,059,606 B2 * | 6/2006 | Butcher | A63F 9/0073 |
| | | | 273/450 |
| 7,114,721 B2 * | 10/2006 | Micarelli | A63F 3/00 |
| | | | 273/242 |
| 8,721,413 B2 * | 5/2014 | Mohammed | A63F 9/10 |
| | | | 463/9 |
| 8,790,178 B1 * | 7/2014 | Fontaine | A63F 13/35 |
| | | | 463/31 |
| 9,155,968 B2 * | 10/2015 | Hedrick | G07F 17/323 |
| 9,594,444 B2 * | 3/2017 | Bae | G06F 3/016 |
| 9,623,322 B1 * | 4/2017 | Wakeford | A63F 13/77 |
| 9,703,369 B1 * | 7/2017 | Mullen | A63F 13/843 |
| 9,753,537 B2 * | 9/2017 | Obana | A63F 13/54 |
| 9,764,357 B2 * | 9/2017 | Houston | H02K 7/061 |
| 9,833,702 B2 * | 12/2017 | Obana | G06F 3/016 |
| 10,080,962 B2 * | 9/2018 | Ito | A63F 13/211 |
| 10,135,412 B2 * | 11/2018 | Obana | H03G 3/3005 |
| 10,322,346 B2 * | 6/2019 | Dong | A63F 13/35 |
| 10,335,685 B2 * | 7/2019 | Ito | A63F 13/573 |
| 10,406,438 B2 * | 9/2019 | Catlin | A63F 13/35 |
| 10,471,346 B2 * | 11/2019 | Yamashita | A63F 13/76 |
| 10,576,370 B1 * | 3/2020 | Adamitskiy | A63F 13/358 |
| 10,576,379 B1 * | 3/2020 | Wakeford | A63F 13/73 |
| 10,589,174 B2 * | 3/2020 | Fukuda | A63F 13/30 |
| 10,758,820 B2 * | 9/2020 | Ueda | A63F 13/24 |
| 10,758,821 B2 * | 9/2020 | Takahashi | A63F 13/77 |
| 10,765,947 B2 * | 9/2020 | Li | A63F 13/54 |
| 10,807,001 B2 * | 10/2020 | Ge | A63F 13/537 |
| 10,888,784 B2 * | 1/2021 | Guimaraes | A63F 13/42 |
| 10,990,813 B2 * | 4/2021 | He | G06V 40/171 |
| 11,013,987 B1 * | 5/2021 | Pelissier | A63F 13/23 |
| 11,013,991 B1 * | 5/2021 | Seibert | A63F 13/24 |
| 11,020,675 B2 * | 6/2021 | Suzuki | A63F 13/533 |
| 11,045,723 B1 * | 6/2021 | Lee | A63F 13/24 |
| 11,097,184 B2 * | 8/2021 | Seibert | A63F 13/235 |
| 11,097,185 B2 * | 8/2021 | Yildiz | G06F 3/016 |
| 11,123,637 B2 * | 9/2021 | Laatikainen | A63F 13/2145 |
| 11,260,288 B2 * | 3/2022 | Seibert | A63F 13/327 |
| 11,260,291 B2 * | 3/2022 | Seibert | G06F 1/1683 |
| 11,278,795 B2 * | 3/2022 | Taura | A63F 13/428 |
| 11,305,189 B2 * | 4/2022 | Taka | G06F 3/04883 |
| 11,331,567 B2 * | 5/2022 | Torres | A63F 13/98 |
| 11,338,197 B2 * | 5/2022 | Pelissier | G06F 13/4291 |
| 11,395,964 B2 * | 7/2022 | Tsuda | G06F 3/0383 |
| 11,426,659 B2 * | 8/2022 | Sato | A63F 13/5258 |
| 11,450,061 B2 * | 9/2022 | Liu | G06T 15/20 |
| 11,452,937 B2 * | 9/2022 | Hamaguchi | A63F 13/5252 |
| 11,491,397 B2 * | 11/2022 | Motokura | A63F 13/843 |
| 11,498,004 B2 * | 11/2022 | Aonuma | A63F 13/57 |
| 11,633,671 B2 * | 4/2023 | Stere | A63F 13/56 |
| | | | 463/31 |
| 11,638,874 B2 * | 5/2023 | Lutz | A63F 13/57 |
| | | | 463/31 |
| 11,653,146 B2 * | 5/2023 | Ogita | G10L 21/16 |
| | | | 381/107 |
| 11,738,265 B2 | 8/2023 | Matsumoto | |
| 2003/0134714 A1 | 7/2003 | Oishi et al. | |
| 2008/0280684 A1 | 11/2008 | McBride et al. | |
| 2012/0094773 A1 | 4/2012 | Suzuki | |
| 2018/0015366 A1 * | 1/2018 | Ito | A63F 13/25 |
| 2018/0056188 A1 | 3/2018 | Miyamoto et al. | |
| 2018/0104591 A1 * | 4/2018 | Fukuda | G06F 3/0488 |
| 2018/0153666 A1 | 6/2018 | Ito | |
| 2018/0353857 A1 * | 12/2018 | Ito | A63F 13/56 |
| 2019/0015744 A1 * | 1/2019 | Ueda | A63F 13/24 |
| 2019/0366221 A1 * | 12/2019 | Suzuki | A63F 13/88 |
| 2019/0388786 A1 | 12/2019 | D'Angelo et al. | |
| 2021/0060432 A1 | 3/2021 | Miyake et al. | |
| 2021/0370179 A1 * | 12/2021 | Sato | A63F 13/5255 |
| 2022/0062760 A1 * | 3/2022 | Motokura | A63F 13/843 |
| 2022/0258054 A1 * | 8/2022 | Matsumoto | A63F 13/837 |
| 2022/0258055 A1 | 8/2022 | Sato et al. | |
| 2022/0370910 A1 * | 11/2022 | Sato | A63F 13/5258 |

FOREIGN PATENT DOCUMENTS

| | | |
|---|---|---|
| JP | 2018-102931 | 7/2018 |
| WO | 2018/042467 | 3/2018 |

OTHER PUBLICATIONS

"Splatoon2 The Complete Guide", Kadokawa Corporation, Mar. 15, 2018, the 6th edition, pp. 010, 034-039 (especially p. 036), ISBN:978-4-04-893313-1.

"Nintendo Official Guide Book Wave Race 64", Shogakukan Inc., Nov. 10, 1996, first edition first printing, pp. 6, 7 (especially p. 6 lower part, p. 7 upper part), ISBN:4-09-102561-7.

"Wave Race Blue Storm", November issue of Dengeki GB Advance, Media Works, Nov. 1, 2001, first vol. No. 7, pp. 24, 25 (especially p. 25 upper left).

\* cited by examiner

NON-TRANSITORY COMPUTER-READABLE STORAGE MEDIUM, INFORMATION PROCESSING APPARATUS, INFORMATION PROCESSING SYSTEM, AND INFORMATION PROCESSING METHOD

CROSS REFERENCE TO RELATED APPLICATION

This application is a continuation of U.S. patent application Ser. No. 17/584,118 filed Jan. 25, 2022, which claims priority to Japanese Patent Application No. 2021-21912 and Japanese Patent Application No. 2021-21913 each filed on Feb. 15, 2021, the entire contents of which are incorporated herein by reference.

FIELD

An exemplary embodiment relates to a non-transitory computer-readable storage medium having stored therein an information processing program, an information processing apparatus, an information processing system, and an information processing method.

BACKGROUND AND SUMMARY

As a background technique, there is a game where a user character moves in a virtual space, a specified area is changed to an area relating to a user's team, the user character is moved in the changed area.

In the above game, however, there is room for improvement in moving the user character on a wall surface as a terrain object.

Therefore, it is an object of an exemplary embodiment to provide a non-transitory computer-readable storage medium having stored therein an information processing program, an information processing apparatus, an information processing system, and an information processing method that enhance the movement of a user character on a wall surface and improve the interest of a game.

To achieve the above object, the exemplary embodiment employs the following configurations.

A non-transitory computer-readable storage medium having stored therein an information processing program according to the exemplary embodiment causes a computer to execute game processing regarding a game performed in a three-dimensional virtual space including at least a terrain object. The information processing program causes the computer to: in accordance with a first operation input provided by a user, change a specified area in the terrain object to a first state; based on a direction operation input provided by the user, perform a first movement process for moving a user character on an area in the first state in a wall surface as the terrain object; in a case where the user character is present on the wall surface in the first state, and while a second operation input provided by the user continues, cause the user character to perform a preliminary action; under the condition that at least the second operation input ends, perform a second movement process for moving the user character performing the preliminary action on the wall surface in the first state in a predetermined direction including at least a component in an up direction; control an enemy character in the virtual space; cause the enemy character to perform an attack having disadvantageous influence in the game on the user character; if the user character reaches a boundary between the wall surface in the first state and an area in the virtual space that is different from the wall surface in the first state due to the movement by the second movement process, reduce the disadvantageous influence imparted by the attack on the user character; and as a result of the second movement process, if the user character reaches the boundary, cause the user character to jump from the boundary.

Based on the above, it is possible to move a user character in an up direction to a boundary of an area in a first state on a wall surface and also cause the user character to jump from the boundary. Consequently, it is possible to enhance the movement of the user character on the wall surface and improve the interest of a game. In a case where a movement by a second movement process is performed, it is possible to reduce disadvantageous influence due to the attack of an enemy character. Thus, it is possible to urge the movement by the second movement process.

The information processing program may further cause the computer to, if the direction operation input is provided while the user character is caused to perform the preliminary action, adjust a position of the user character on the wall surface in the first state in accordance with the direction operation input.

Based on the above, it is possible to adjust the position of the user character on the wall surface during a preliminary action and adjust the position where the movement by the second movement process is started.

A moving velocity of the user character based on the adjustment may be slower than the moving velocity of the user character based on the first movement process.

Based on the above, when the position of the user character on the wall surface is adjusted during the preliminary action, it is possible to facilitate the adjustment of the position.

In the second movement process, after the second operation input ends, and while the direction operation input continues, the user character may be moved on the wall surface in the first state.

Based on the above, a direction operation input is continued, whereby it is possible to continue the movement of the user character on the wall surface.

In the second movement process, a moving direction of the user character may be changed in accordance with the direction operation input, and if the direction operation input satisfies a predetermined condition, the movement of the user character may be stopped.

Based on the above, if the movement by the second movement process is performed, it is possible to change the moving direction by a direction operation input and also stop the movement.

In the first movement process, the user character may be moved in a first display form, and while the user character is caused to perform the preliminary action, the user character may be displayed in a second display form having a visibility higher than a visibility of the first display form.

Based on the above, the visibility becomes high during a preliminary action. Thus, it is possible to prevent the user character from becoming too advantageous due to the movement by the second movement process.

A height of the jump of the user character may differ in accordance with time of the preliminary action.

Based on the above, for example, it is possible to adjust the height of the jump by adjusting the time of a preliminary action. Thus, it is possible to appropriately use jumps in accordance with the situation. This can improve the interest of a game.

A moving velocity of the user character based on the second movement process may differ in accordance with time of the preliminary action.

Based on the above, for example, it is possible to adjust the moving velocity by adjusting the time of a preliminary action. Thus, it is possible to appropriately use movements in accordance with the situation. This can improve the interest of a game.

In the second movement process, after the second operation input ends, and while the direction operation input continues, the moving velocity of the user character relating to the time of the preliminary action may be maintained.

Based on the above, if a direction operation input continues to be provided, it is possible to maintain the moving velocity of the user character set in accordance with the time of the preliminary action.

The information processing program may further cause the computer to: in a case where the user character is present on the wall surface in the first state, and if the direction operation input is not provided, perform a third movement process for automatically moving the user character in a down direction in the virtual space; and if the user character is caused to perform the preliminary action, reduce the movement by the third movement process.

Based on the above, for example, in a case where gravity always acts in a down direction in a virtual space, it is possible to reduce a movement in the down direction due to gravity during a preliminary action.

The information processing program may further cause the computer to, if a third operation input is provided by the user while the user character is caused to perform the preliminary action or during the movement by the second movement process, cause the user character to jump in a direction away from the wall surface.

Based on the above, even while the user character is performing a preliminary action on the wall surface, and even during the movement by the second movement process, it is possible to cause the user character to jump in a direction away from the wall surface by a third operation input.

A moving velocity of the user character may be faster in the movement by the second movement process than in the movement by the first movement process.

Based on the above, it is possible to promote the movement by the second movement process. Thus, it is possible to vary the movement of the user character on the wall surface.

If the user character reaches the boundary due to the movement by the second movement process, the user character may perform the jump beyond the boundary. If the user character reaches the boundary due to the movement by the first movement process, and even if the user character jumps beyond the boundary, a height of the jump may be lower than a height of the jump due to the movement by the second movement process.

Based on the above, it is possible to promote the movement by the second movement process.

Another exemplary embodiment may be an information processing apparatus that executes the information processing program, or may be an information processing system, or may be an information processing method.

According to the exemplary embodiment, it is possible to move a user character to a boundary of an area in a first state on a wall surface and also cause the user character to jump from the boundary.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
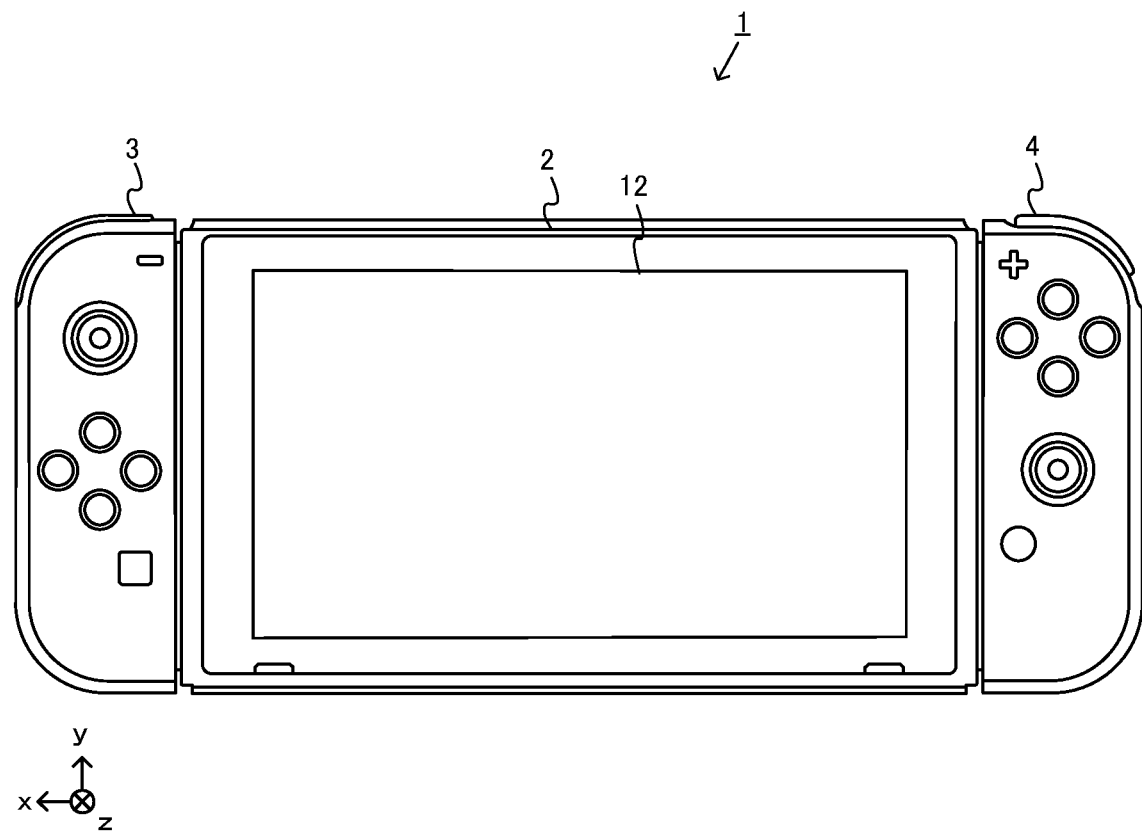
FIG. 1 is a diagram showing an example non-limiting state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
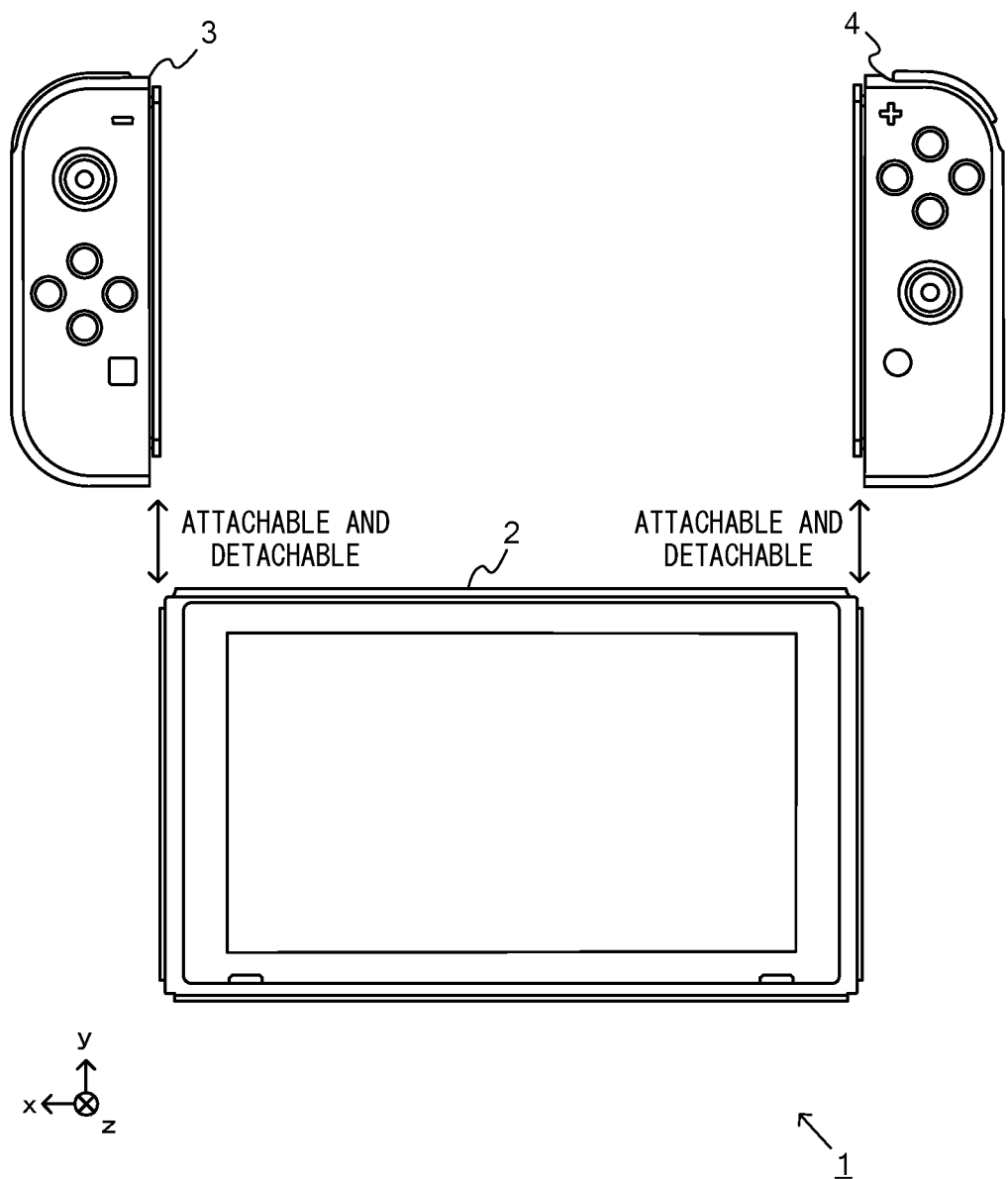
FIG. 2 is a diagram showing an example non-limiting state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
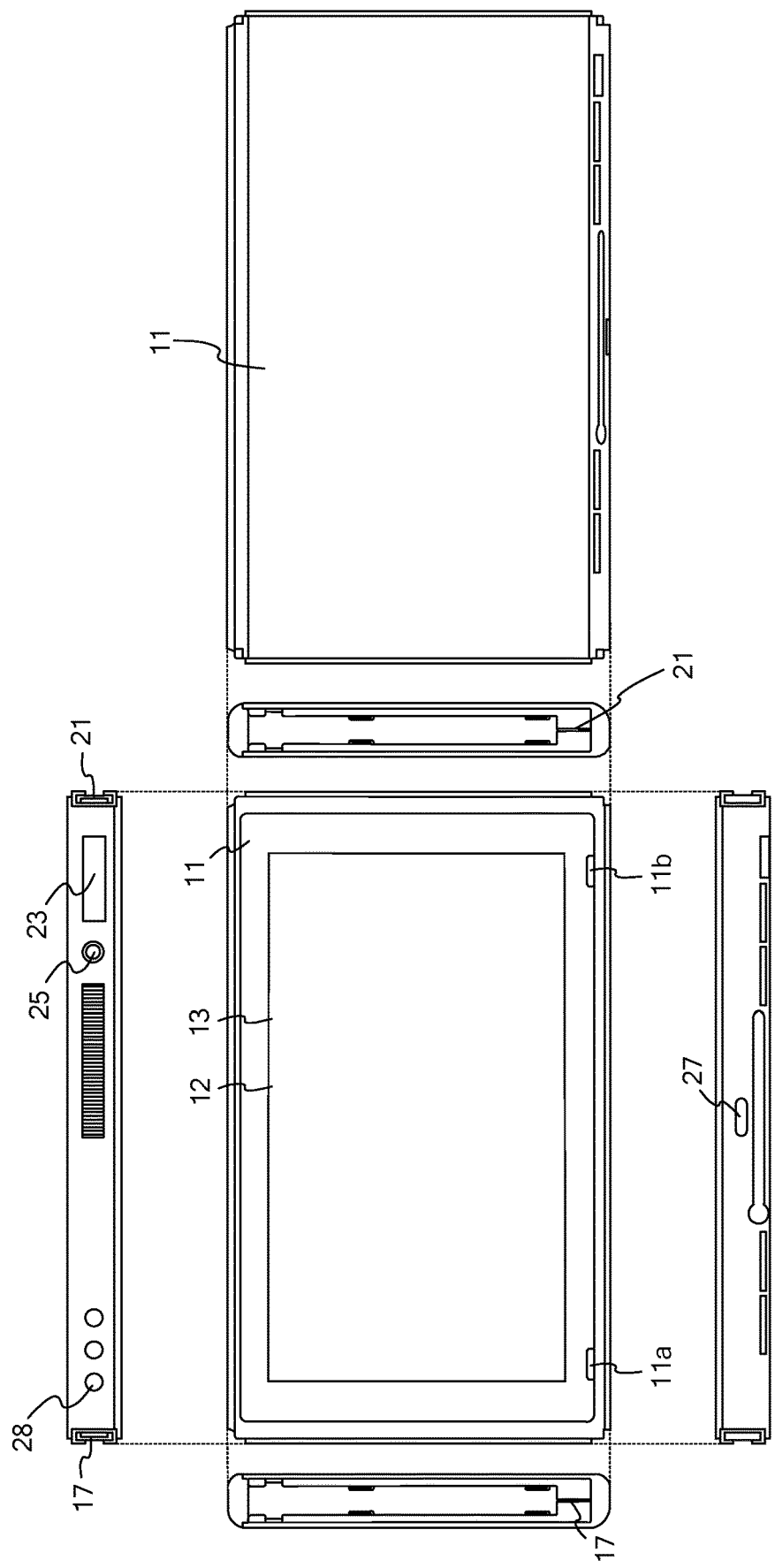
FIG. 3 is six orthogonal views showing an example non-limiting main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11*a* and 11*b* are formed on the main surface of the housing 11. Then, sounds output from the speakers 88 are output through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
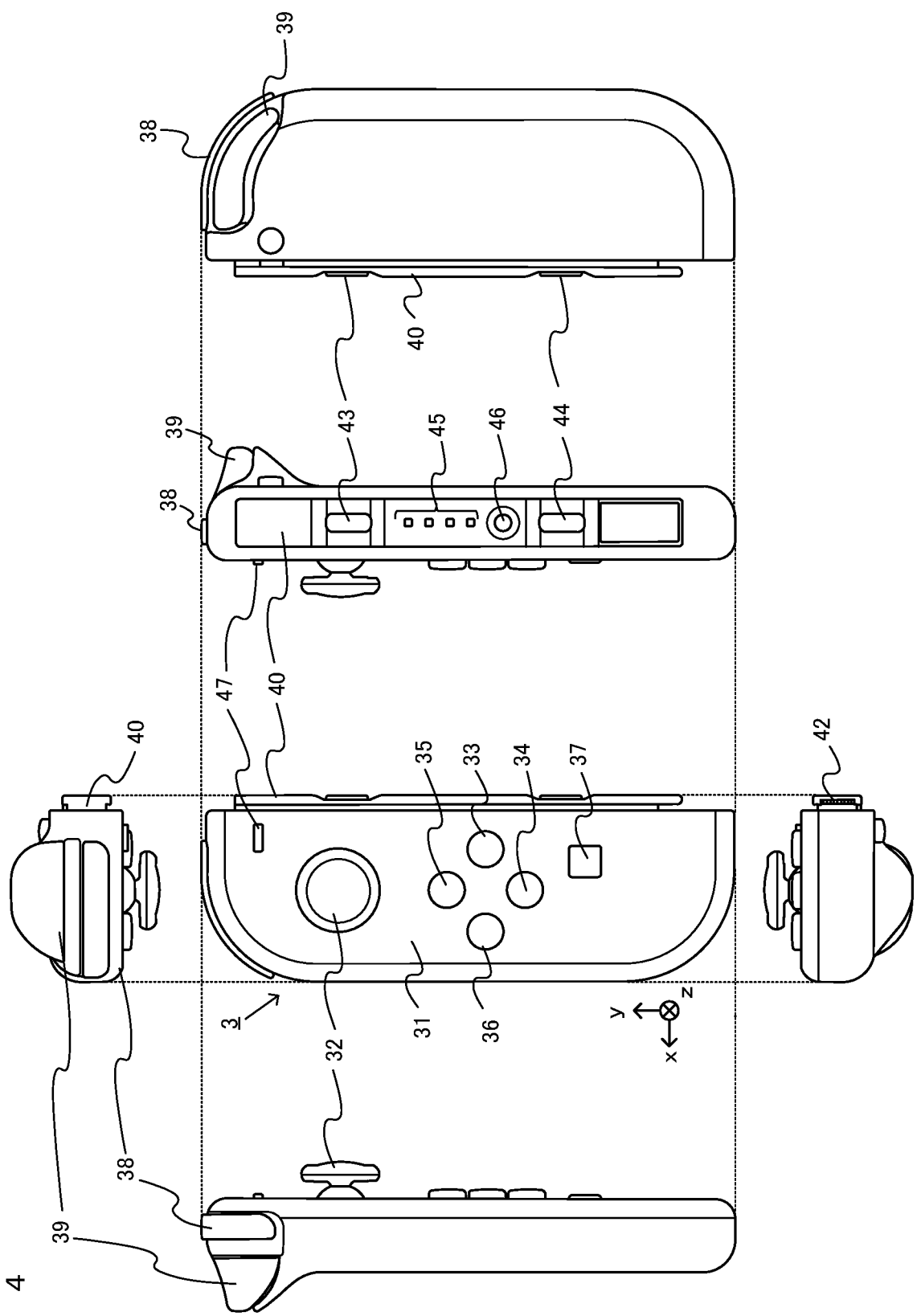
FIG. 4 is six orthogonal views showing an example non-limiting left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
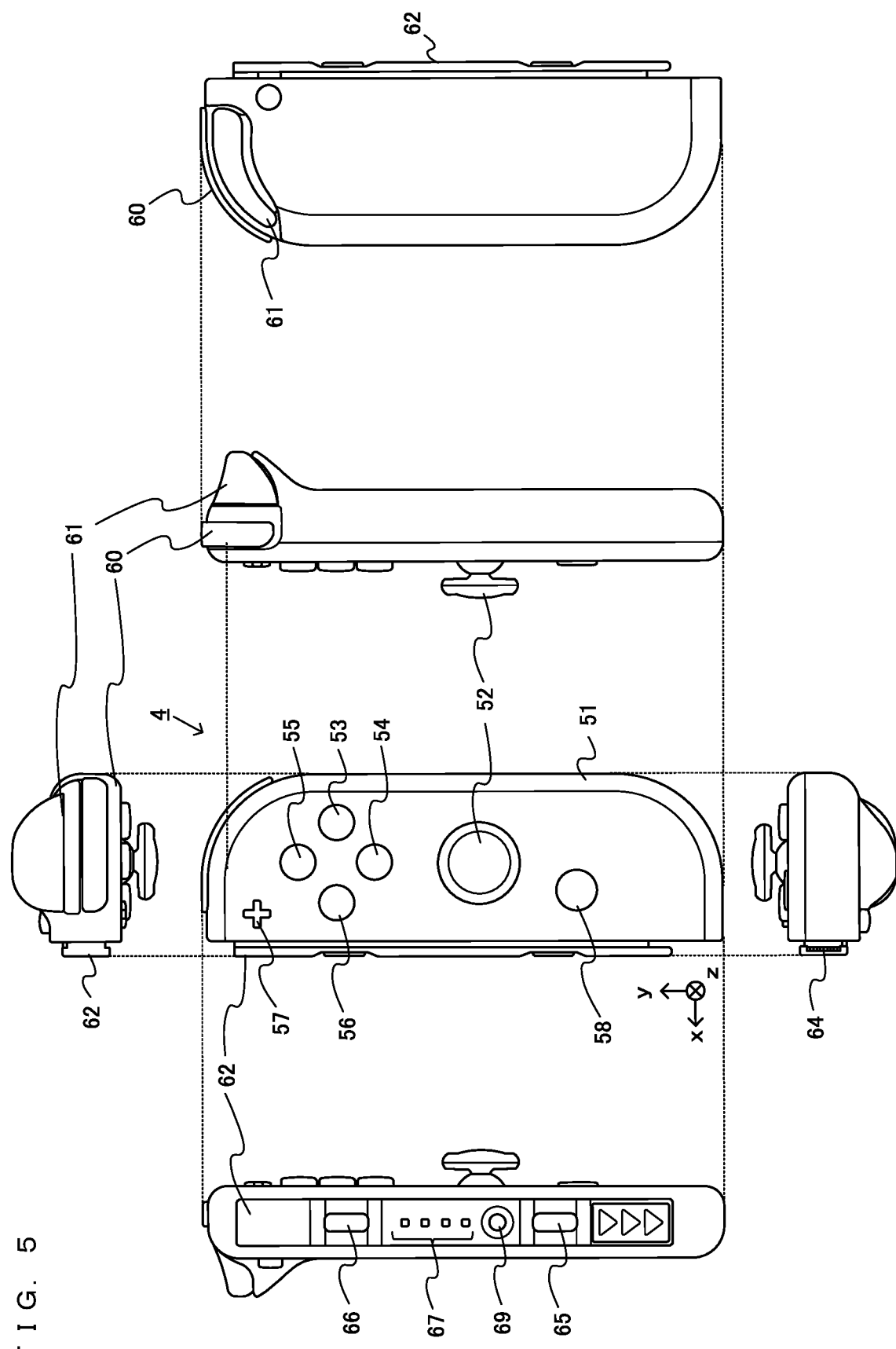
FIG. 5 is six orthogonal views showing an example non-limiting right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
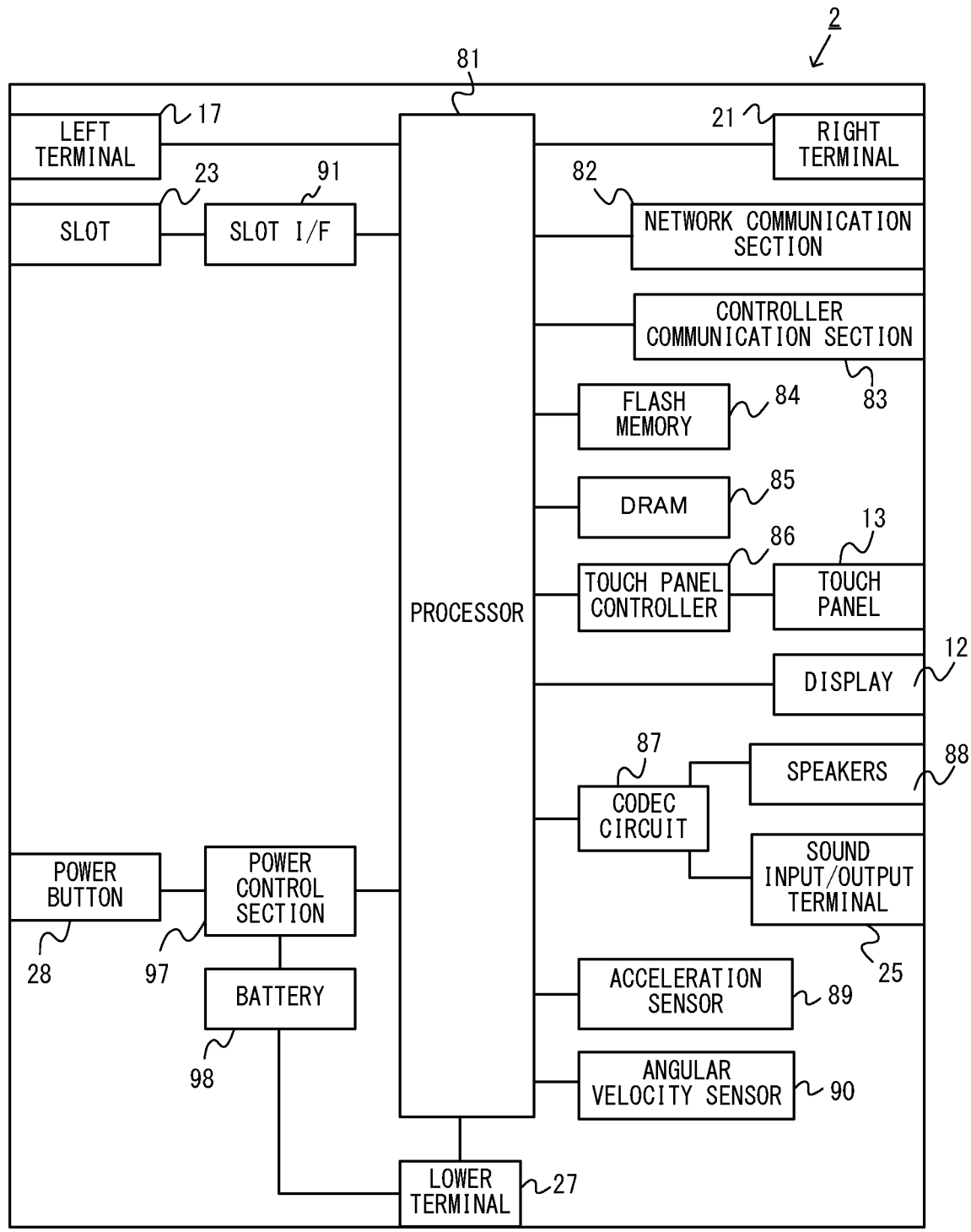
FIG. 6 is a block diagram showing an example non-limiting internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth® standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
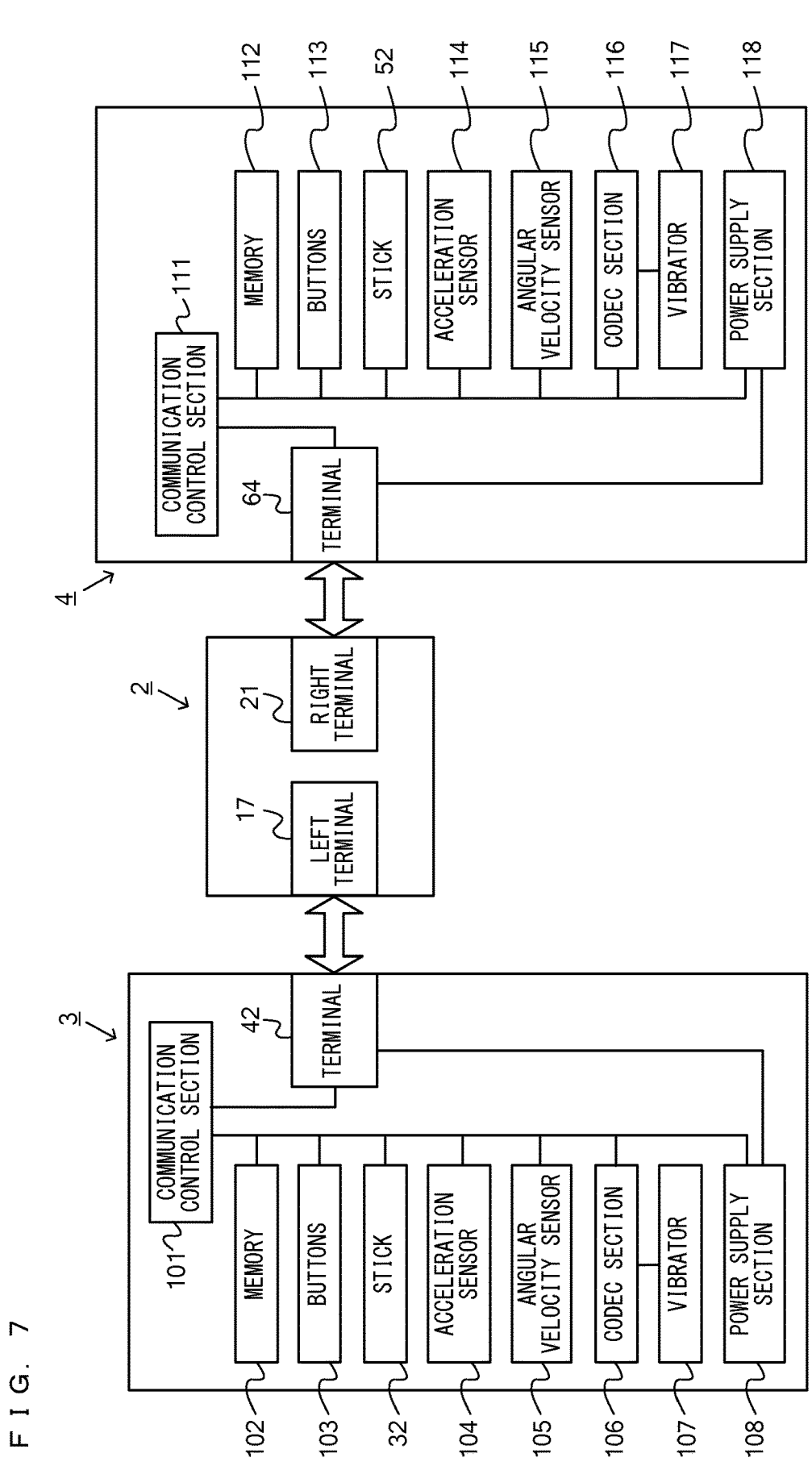
FIG. 7 is a block diagram showing example non-limiting internal configurations of the main body apparatus 2 and the left controller 3 and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth® standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth® standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

Overview of Game According to Exemplary Embodiment

Next, an overview of a game according to the exemplary embodiment is described. The game according to the exemplary embodiment is a multiplay game where a plurality of users operate respective characters using game apparatuses (the main body apparatus 2 and the controllers 3 and 4) of the users. The plurality of game apparatuses are connected to a network (a LAN or the Internet) and communicate directly or indirectly via a server or the like with each other, thereby performing game processing. For example, the plurality of users belong to either of two teams, and each user cooperates with a user of the user's team to compete against the enemy team. A character relating to each user is placed in the same virtual space, and each character is caused to perform an action in the virtual space, whereby the game progresses. On a display device (the display 12 or the stationary monitor) of the game apparatus of each user, the character of the user is displayed, and the characters relating to the other users are also displayed.

Figure 8:
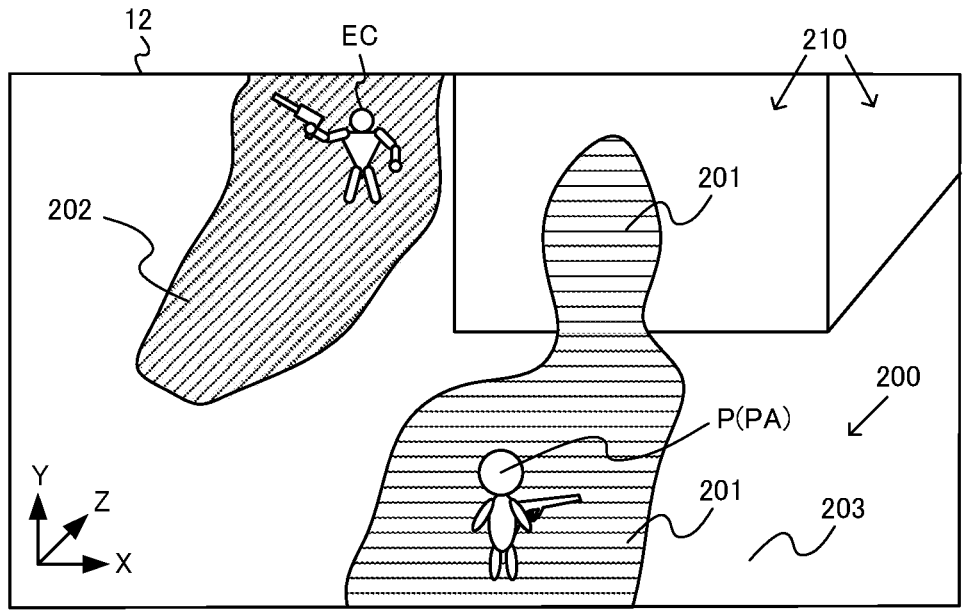
FIG. 8 is a diagram showing an example non-limiting game image displayed on a display device when a game according to the exemplary embodiment is executed.

FIG. 8 is a diagram showing an example of a game image displayed on the display device when the game according to the exemplary embodiment is executed. In the game according to the exemplary embodiment, a plurality of game stages are prepared. In a three-dimensional virtual space, terrain objects relating to a game stage are placed, and a plurality of characters are controlled on the terrain objects.

As shown in FIG. 8, in the virtual space, a user character P and an enemy character EC are placed. The user character P is operated by the user of this game apparatus (the main body apparatus 2). The enemy character EC is operated by another user as an opponent.

In the virtual space, terrain objects forming terrains are placed. Specifically, as the terrain objects, a ground object 200 and a wall surface object 210 are placed. The ground object 200 is an object forming the ground, and for example, is a surface parallel to an XZ-plane fixed in the virtual space. The wall surface object 210 is an object forming a wall surface, and for example, is a surface perpendicular to the XZ-plane (a surface parallel to a Y-axis fixed in the virtual space).

In the virtual space, a virtual camera relating to the user character P is set, and based on the virtual camera, a game image of the virtual space including the user character P is generated and displayed on the display device. The virtual camera moves in accordance with the movement of the user character P and rotates about the user character P in accordance with an operation input (e.g., a direction operation input to the analog stick 52) provided by the user.

In accordance with operation inputs to the left controller 3 and the right controller 4, the user character P moves in the virtual space and performs a predetermined action in the virtual space. For example, in accordance with the pressing of a fire button (e.g., the ZR-button 61 of the right controller 3), the user character P shoots liquid (e.g., red ink) into the virtual space. The direction in which the liquid is to be shot is set in accordance with an operation input provided by the user. For example, the liquid is shot in the direction of the line of sight of the virtual camera controlled in accordance with an operation input provided by the user. A predetermined area in the virtual space in the direction in which the liquid is shot is changed to a first state (e.g., the state where the predetermined area is painted in red) by the shot liquid. Also if another user of the user's team presses the fire button, the character relating to another user of the user's team shoots liquid in the same color, and a predetermined area in the virtual space in the direction in which the liquid is shot changes to the first state. Each of the surfaces of the terrain objects in the virtual space can change to the first state. In FIG. 8, a partial area of the ground object 200 parallel to the XZ-plane and a partial area of the wall surface object 210 perpendicular to the XZ-plane are changed to the first state. In FIG. 8, an area 201 is a first state area changed by each user of the user's team shooting liquid. If the liquid shot by the user character P hits the enemy character EC, the enemy character EC is damaged.

If the user relating to the enemy character EC presses the fire button, liquid in a different color (e.g., blue ink) is shot by the enemy character EC, and a predetermined area in the virtual space in the direction in which the liquid is shot is changed to a second state (e.g., the state where the predetermined area is painted in blue) by the shot liquid. The same applies to another character of the enemy team. In FIG. 8, an area 202 is a second state area changed by each user of the enemy team shooting liquid. If the liquid shot by the enemy character EC hits the user character P, the user character P is damaged.

When the game starts, each of the surfaces of the terrain objects is in an initial state, which is neither the first state nor the second state. In FIG. 8, an area 203 is an initial state area. Each user advances the game while painting over areas of the terrain objects in the virtual space in the color of the team to which the user belongs.

The user character P can change to a normal state and a special state. For example, while the ZL-button 39 of the left controller 3 is pressed, the user character P is in the special state. While the ZL-button 39 is not pressed, the user character P is in the normal state. The enemy character EC and another character of the user's team can also change to the normal state and the special state.

For example, the user character P in the normal state is a human-shaped character. As shown in FIG. 8, hereinafter, the user character P in the normal state will be referred to as a "user character PA". The user character in the normal state and the user character in the special state will be collectively referred to as a "user character P".

The user character P can move on the ground object 200 in accordance with a direction operation input (e.g., a direction input to the analog stick 32 of the left controller 3) provided by the user. For example, when the user character P is present on the ground object 200, and if the right direction of the analog stick 32 is input, the user character P moves in the right direction of the screen. If the up direction of the analog stick 32 is input, the user character P moves in the depth direction of the screen.

The user character PA in the normal state can move on the ground object 200 no matter which of the first state, the second state, and the initial state the ground object 200 is in. In a case where the user character PA is at rest on the ground object 200, and if a direction operation input is provided, the user character PA accelerates in a direction in the virtual space relating to the input direction of the analog stick 32 and reaches a certain velocity. If the direction operation input ends, the user character P starts decelerating and stops after the lapse of time. The acceleration and the certain velocity at which the user character P moves on the ground object 200 differ depending on the area where the user character P is located and the state of the user character P.

Specifically, if the user character PA in the normal state is present on the first state area 201 or the initial state area 203, the user character PA moves at a normal velocity on the first state area 201 or the initial state area 203 in accordance with a direction operation input. Hereinafter, the "normal velocity" will mean the velocity at which the user character PA moves at a certain velocity on the first state area 201 or the initial state area 203.

If the user character PA in the normal state is present on the second state area 202, the user character PA moves at a velocity slower than the normal velocity on the second state area 202 in accordance with a direction operation input. That is, a certain velocity of the user character PA on the second state area 202 is a velocity slower than the normal velocity.

In the virtual space, gravity always acts downward. If there is not a surface parallel to the XZ-plane or a surface at a predetermined angle or less to the XZ-plane below the user character P, the user character P continues to fall downward. Thus, the user character PA cannot continue to be located on the wall surface object 210. Even if the user character PA momentarily comes into contact with the wall surface object 210, the user character PA falls to the ground object 200. As will be described below, however, if the user character P is in the special state, the user character P can also continue to be located on the wall surface object, or move.

In accordance with an operation input to a jump button (e.g., the B-button 54 of the right controller 4), the user character PA in the normal state jumps on the ground object 200 in any of the first state, the second state, and the initial state. After jumping, the user character PA falls downward due to gravity.

Figure 9:
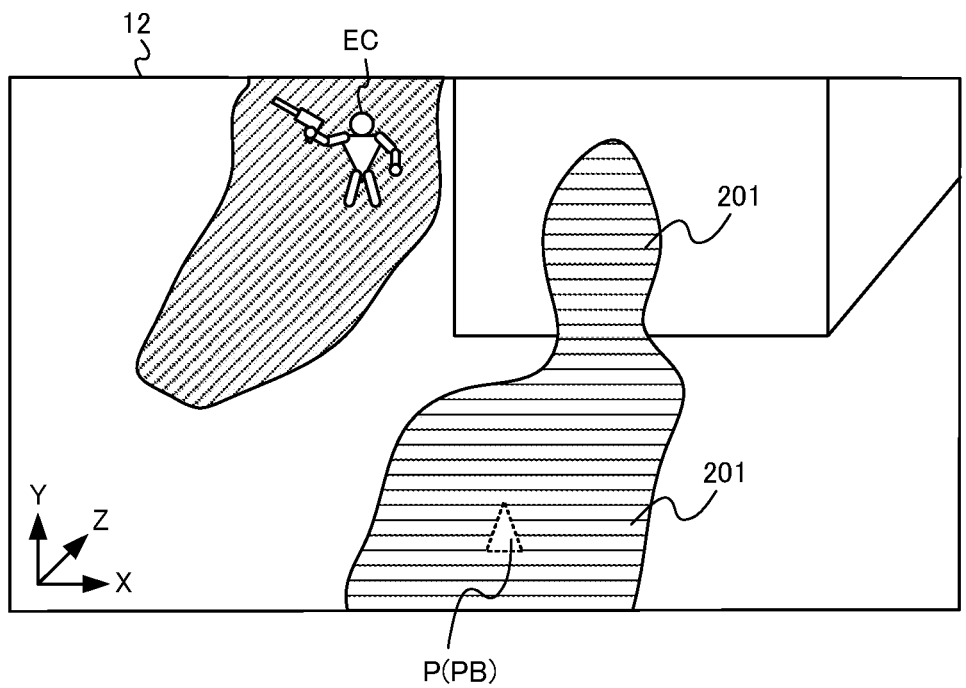
FIG. 9 is a diagram showing an example non-limiting game image when a user character P is changed to a special state.

FIG. 9 is a diagram showing an example of a game image when the user character P is changed to the special state. As shown in FIG. 9, the display form (the shape, the color, the pattern, and the like) of the user character P in the special state is different from that in the normal state. In FIG. 9, the user character P in the special state is represented by a triangle. The display form of the user character P in the special state may be any display form. As shown in FIG. 9, hereinafter, the user character P in the special state will occasionally be referred to as a "user character PB".

If the user character PB in the special state is present on the first state area 201, the user character PB is in a hidden state where the user character PB is hidden in the liquid. In the hidden state, the user character PB in the special state is in the state where the user character PB is difficult to visually confirm, and is in the state where the user character PB is difficult for the enemy character EC (the user relating to the enemy character) to discover. Thus, the user character PB in the hidden state is in the state where the user character PB is less likely to be attacked by the enemy character EC and is advantageous. Specifically, the first state area 201 is an image in which liquid is painted on the ground object 200, and looks planar (is not different or slightly different in level from the ground in the initial state). In the hidden state, however, the first state area 201 is an image in which the user character PB crawls under the ground. As a result, the outward appearances of a portion where the user character PB is hidden and a portion where the user character PB is not hidden are the same as or slightly different from each other. Thus, the user character PB is difficult for another user to discover. In the hidden state, the user character PB may become planar and assimilated with the surface of the liquid and become difficult for another user to discover. In FIG. 9, the user character PB in the hidden state is indicated by a dotted triangle. The same applies to other figures.

If, on the other hand, the user character PB in the special state is present on an area in the initial state or the second state, the user character PB is in an exposed state. In the exposed state, the user character PB in the special state is in the state where the user character PB is easy to visually confirm, and is in the state where the user character PB is easy for the enemy character EC (the user relating to the enemy character) to discover. For example, the exposed state is the state where the entire body of the user character PB in the special state is exposed. Thus, the user character PB in the exposed state is likely to be attacked by the enemy character EC. The user character PA in the normal state is in the exposed state no matter which of the areas 201 to 203 the user character PA is in. On the second state area 202, the user character P cannot change to the special state. Thus, on the second state area 202, the user character P is in the exposed state.

The user character PB in the special state jumps on the ground object 200 in accordance with an operation input to the jump button. If the user character PB in the hidden state jumps, the user character PB temporarily moves in the up direction in the virtual space and changes to the exposed state. In the following figures, the user character PB in the exposed state is indicated by a solid triangle. The user character PB in the exposed state is easy for the enemy character EC to the discover.

The user character PB in the special state can move on the ground object 200 in accordance with a direction operation input (e.g., a direction input to the analog stick 32) provided by the user. When the user character PB in the special state is present on the first state area 201 in the ground object 200 (i.e., is in the hidden state), the user character PB can move at a first velocity faster than the normal velocity in accordance with a direction operation input. Specifically, when the user character PB is in the hidden state, and if a direction operation input is provided using the analog stick 32, an acceleration is applied to the user character PB in a direction in the virtual space relating to the input direction. If the input to the same direction is continued, the user character PB in the hidden state is accelerated to the first velocity faster than the normal velocity. The acceleration of the user character PB in the hidden state may be greater than the acceleration of the user character PA in the normal state. If the direction operation input ends, the user character PB in the hidden state decelerates and stops after the lapse of time.

When the user character PB is moving in a first direction on the first state area 201 in the ground object 200, and if a direction operation input for moving the user character PB in a second direction is provided, the moving direction of the user character PB changes to the second direction. Specifically, the user character PB does not immediately change direction to the second direction, but changes direction to the second direction under the influence of inertia over a certain time. That is, when the user character PB is moving in the first direction, and if a direction operation input for moving the user character PB in the second direction is provided, the moving direction of the user character PB changes from the first direction to the second direction over a certain time. "During a change of direction" refers to the period when the moving direction of the user character PB changes from the first direction to the second direction. "A change of direction is completed" refers to the moving direction of the user character PB changing to the second direction.

On the initial state area 203, the user character PB in the special state moves at a velocity slower than the normal velocity in accordance with a direction operation input. On the initial state area 203, the acceleration of the user character PB in the special state may be smaller than the accelerations of the user character PB in the hidden state and the user character PA in the normal state.

Figure 10:
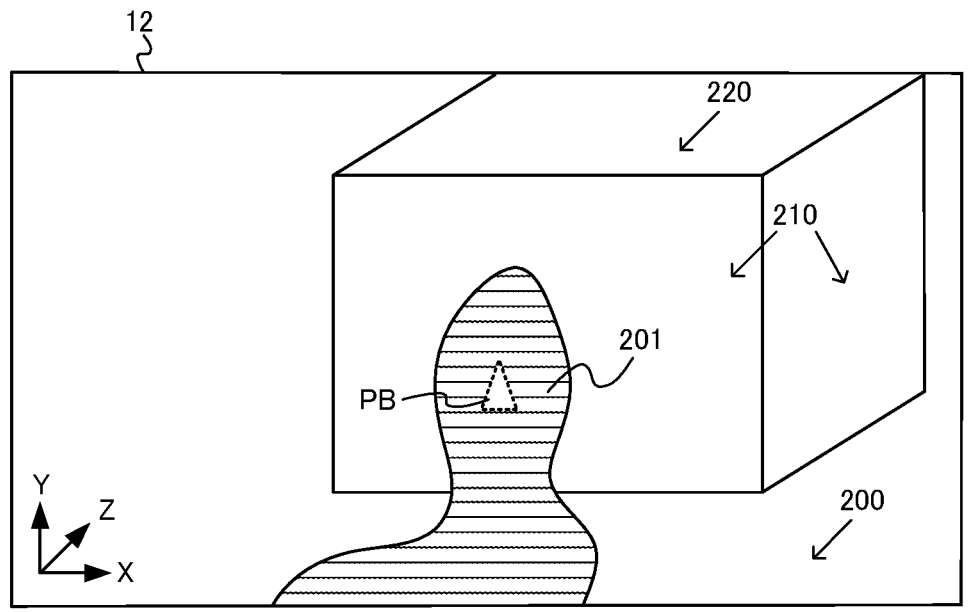
FIG. 10 is a diagram showing an example non-limiting state where a user character PB in the special state is present on a wall surface object 210.
Figure 11:
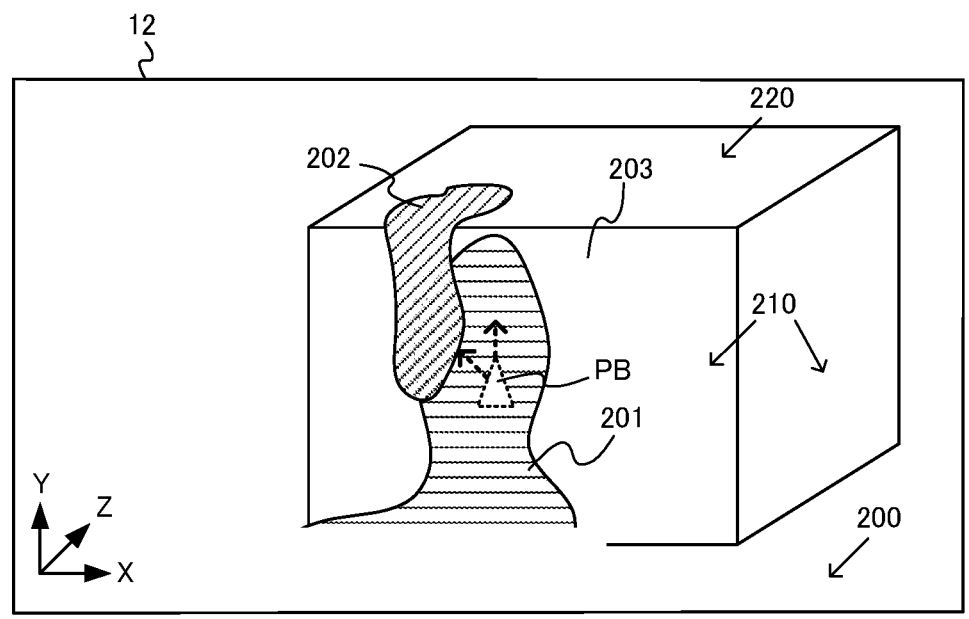
FIG. 11 is a diagram showing an example non-limiting state where the user character PB in the special state moves on the wall surface object 210.

FIG. 10 is a diagram showing an example of the state where the user character PB in the special state is present on the wall surface object 210. FIG. 11 is a diagram showing an example of the state where the user character PB in the special state moves on the wall surface object 210.

As shown in FIGS. 10 and 11, the user character PB in the special state can move on the wall surface object 210. Specifically, the user character PB moves in a direction relating to a direction operation input on the first state area 201 in the wall surface object 210. For example, in a case where the user character PB in the special state is present on the first state area 201 in the wall surface object 210, and if a direction operation input to the up direction is provided using the analog stick 32, the user character PB moves in the up direction on the first state area 201 in the wall surface object 210. If a direction operation input to the right direction is provided, the user character PB moves in the right direction on the first state area 201 in the wall surface object 210.

The moving velocity of the user character PB on the wall surface object 210 is faster than the normal velocity. This moving velocity may be the first velocity, or may be slower than the first velocity. The moving velocities in the up direction and the down direction on the wall surface object 210 may be influenced/affected by gravity.

In a case where the user character PB is present on the first state area 201 in the wall surface object 210, and if a direction operation input is not provided, the user character PB automatically moves downward under the influence of gravity. The fall velocity in this case is slower than a normal fall velocity (e.g., the fall velocity in a case where the user character PB is present on the wall surface and not present on the first state area 201), and the user character PB moves downward relatively slowly along the wall surface object 210.

As shown in FIG. 11, the user character PB present on the first state area 201 in the wall surface object 210 cannot move while remaining in the hidden state beyond the boundary between the area 201 and another area (the second state area 202 or the initial state area 203 in the wall surface object 210). If the user character PB goes beyond the boundary, the user character PB changes to the exposed state and falls.

Next, a description is given of actions in a case where the jump button is pressed when the user character PB in the special state is moving on the first state area 201. First, a description is given of jump actions when the user character PB in the special state is moving on the first state area 201 in the ground object 200. In the exemplary embodiment, when the user character PB in the special state is moving on the first state area 201 in the ground object 200, and if the jump button is pressed, different jump actions are performed in a case where a velocity condition and a first direction condition described below are satisfied and a case where the velocity condition and the first direction condition are not satisfied. Specifically, if at least either one of the velocity condition and the first direction condition is not satisfied, a first jump action is performed. If the velocity condition and the first direction condition are satisfied, a second jump action is performed. A description is given below of the first jump action and the second jump action.

First Jump Action

Figure 12:
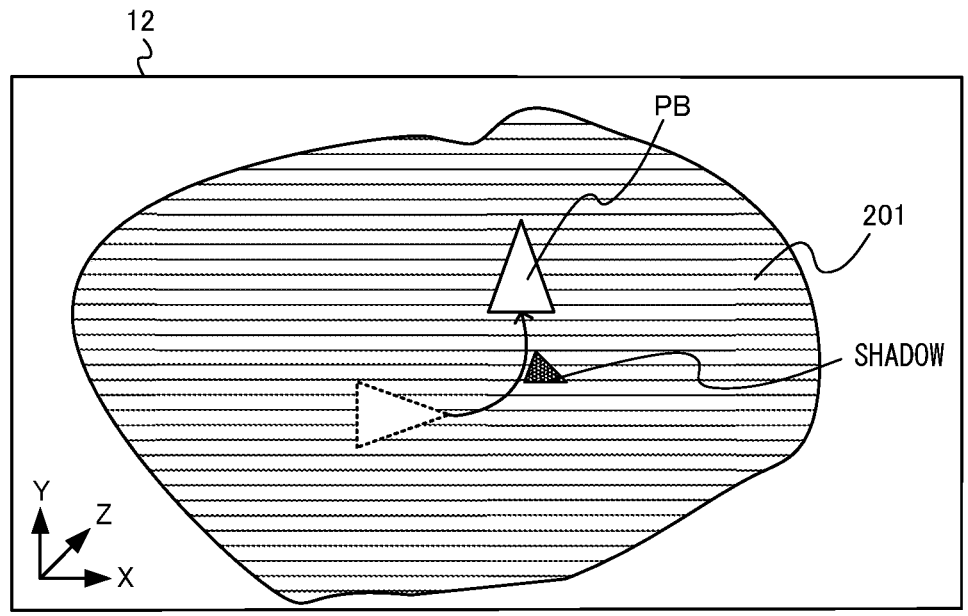
FIG. 12 is a diagram showing an example non-limiting trajectory of the user character PB in a case where a first jump action involving a change of direction to the depth direction of a screen is performed when the user character PB in the special state is moving in the right direction on a first state area 201 in a ground object 200.
Figure 13:
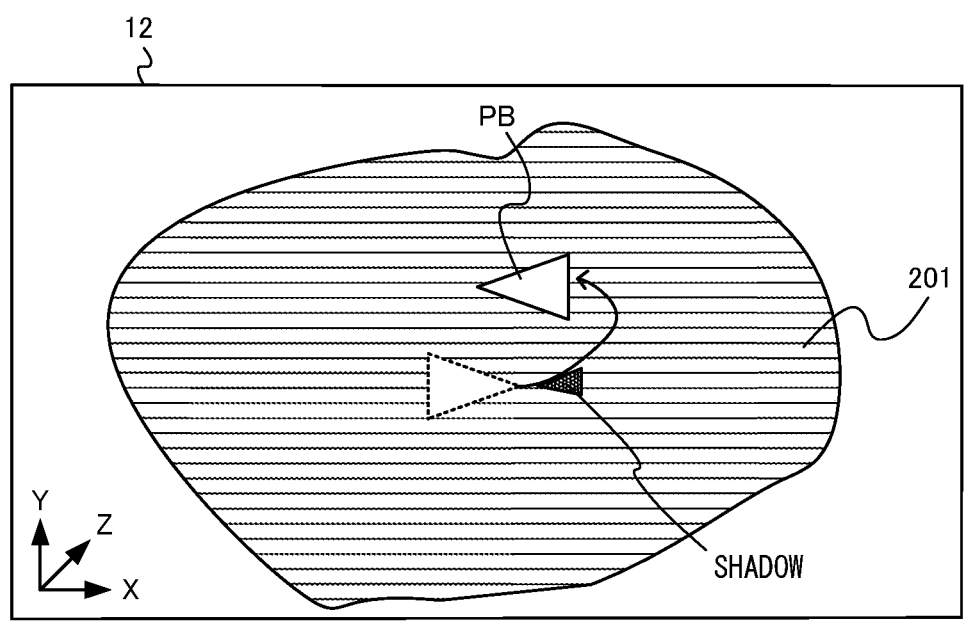
FIG. 13 is a diagram showing an example non-limiting trajectory of the user character PB in a case where the first jump action involving a change of direction to the left direction is performed when the user character PB in the special state is moving in the right direction on the first state area 201 in the ground object 200.

FIG. 12 is a diagram showing an example of the trajectory of the user character PB in a case where the first jump action involving a change of direction to the depth direction of the screen is performed when the user character PB in the special state is moving in the right direction on the first state area 201 in the ground object 200. FIG. 13 is a diagram showing an example of the trajectory of the user character PB in a case where the first jump action involving a change of direction to the left direction is performed when the user character PB in the special state is moving in the right direction on the first state area 201 in the ground object 200.

In FIGS. 12 and 13, a dotted triangle indicates the position of the user character PB in the hidden state immediately before the jump button is pressed. A solid triangle indicates the user character PB while jumping (in the exposed state) after the change of direction. A solid arrow indicates the trajectory of the user character PB. In FIGS. 12 and 13, for simplicity, the user character PB and the area 201 around the user character PB are displayed in an enlarged manner FIGS. 12 and 13 show images when the user character PB is jumping, in which the shadow of the user character PB is projected onto the ground and which represent the user character PB floating in the air.

As shown in FIG. 12, when the user character PB is present on the first state area 201 in the ground object 200, and if a direction operation input to the right direction is continued, the user character PB moves in the right direction while remaining in the hidden state. When the user character PB is moving in the right direction, and for example, if a direction operation input to the up direction is provided and the jump button is pressed, and if at least either one of the velocity condition and the first direction condition is not satisfied, the first jump action is performed. In the first jump action, as described above, it takes a certain time for the moving direction of the user character PB to change to the depth direction under the influence of inertia. Specifically, when the user character PB is moving in the right direction, and if a direction operation input to the up direction is provided and the jump button is pressed, the user character PB jumps, and the velocity in the right direction decreases, and the user character PB also accelerates in the depth direction. Then, if a certain time elapses, the moving direction of the user character PB changes to the depth direction (a Z-axis direction in FIG. 12). While the user character PB is jumping, the user character PB is in the exposed state, and the acceleration in a direction relating to the input direction is smaller than that in the hidden state. Thus, in a case where a direction operation input for a change of direction is provided together with an input to the jump button, it takes a longer time to reach a certain position after the change of direction than in a case where only a direction operation input for a change of direction is merely provided. The timing when the user character PB jumps may not only be the timing when the jump button is pressed, but also be during the decrease in the velocity in the right direction, or after the change of direction to the depth direction. When the user character PB starts jumping, the moving direction of the user character PB may remain in the right direction, and the moving direction may change to the depth direction during the jump.

As shown in FIG. 13, when the user character PB is moving in the right direction while remaining in the hidden state, and for example, if a direction operation input to the left direction is provided and the jump button is pressed, and if at least either one of the velocity condition and the first direction condition is not satisfied, the first jump action is performed. Specifically, if a direction operation input to the left direction is provided and the jump button is pressed, the user character PB jumps, and the velocity in the right direction decreases. Then, after a certain time elapses, the moving direction of the user character PB changes to the left direction. The decreased velocity in the right direction is made fast under the influence of the acceleration in the left direction due to the direction operation input to the left direction.

Figure 14:
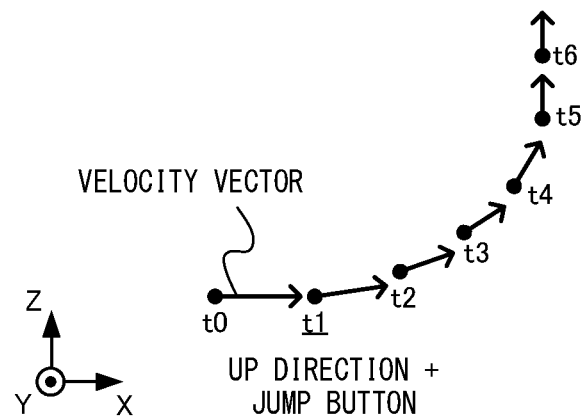
FIG. 14 is a diagram showing an example non-limiting change in the position of the user character PB and a velocity vector at this position in a case where the first jump action shown in FIG. 12 is performed.
Figure 15:
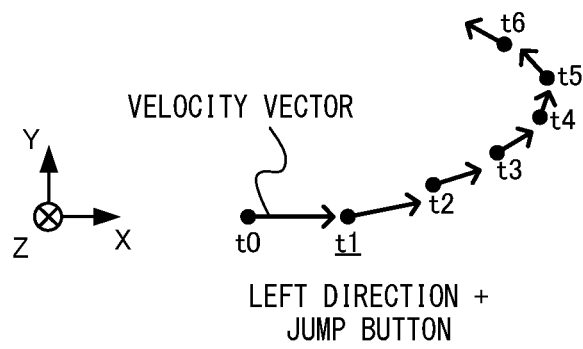
FIG. 15 is a diagram showing an example non-limiting change in the position of the user character PB and a velocity vector at this position in a case where the first jump action shown in FIG. 13 is performed.

FIG. 14 is a diagram showing examples of a change in the position of the user character PB and a velocity vector at this position in a case where the first jump action shown in FIG. 12 is performed. FIG. 15 is a diagram showing examples of a change in the position of the user character PB and a velocity vector at this position in a case where the first jump action shown in FIG. 13 is performed.

In FIGS. 14 and 15, arrows represent velocity vectors of the user character PB at times (t0, t1, t2, . . . ). The starting point of each arrow represents the position of the user character PB at the time, the direction of the arrow represents the moving direction, and the length of the arrow represents the speed. The interval between times is, for example, one to several frame times. For example, one frame time may be 1/60 seconds.

As shown in FIG. 14, at a time t0, a direction operation input to the right direction is provided, and the user character PB is moving in the right direction at a velocity that does not satisfy the velocity condition. Suppose that at a time t1, a direction operation input to the up direction and an input to the jump button are provided. In this case, at the time t1, the user character PB jumps and changes to the exposed state due to the jump. At the time t1, the moving direction of the user character PB does not change to the depth direction (the Z-axis direction) of the screen, and the user character PB maintains the movement in the right direction and decreases the velocity in the right direction. The length of the velocity vector at the time t1 is shorter than the length of the velocity vector at the time t0. Also during times t2 to t4, the user character PB continues to move in the right direction while continuing the jump state. During these times, however, the user character PB continues to decrease the velocity in the right direction. That is, during the times t1 to t4, the user character PB is changing direction. Then, at a time t5, an X-direction component of the velocity vector of the user character PB becomes "0". That is, at the time t5, the moving direction of the user character PB changes to the depth direction of the screen (i.e., the change of direction is completed). The velocity of the user character PB immediately after the change of direction (the length of the velocity vector at the time t5) is less than the first velocity. At the time t6 and after that, the jump state ends due to a fall. The moving direction of the user character PB continues to be the depth direction of the screen. The timing when the jump of the user character PB ends may be between the times t2 and t5. In a case where the user character PB changes direction and jumps by the first jump action, the acceleration is made slower than in a case where the user character PB changes direction while remaining in the hidden state. Thus, the user character PB is more likely to be attacked by the enemy character EC.

As shown in FIG. 15, suppose that when the user character PB is moving in the right direction, at a time t1, a direction operation input to the left direction and an input to the jump button are provided. In this case, at the time t1, the user character PB jumps and changes to the exposed state due to the jump. At the time t1, the moving direction of the user character PB does not change to the left direction, and the user character PB maintains the movement in the right direction and decreases the velocity in the right direction. The length of the velocity vector at the time t1 is shorter than the length of the velocity vector at a time t0. Also during times t2 to t4, the user character PB continues to move in the right direction while continuing the jump state. During these times, however, the user character PB continues to decrease the velocity in the right direction. Then, at a time t5, the velocity vector of the user character PB has a component in a negative X-axis direction. That is, at the time t5, the moving direction of the user character PB changes to the left direction of the screen (i.e., the change of direction is completed). The velocity of the user character PB immediately after the change of direction (the length of the velocity vector at the time t5) is less than the first velocity. At the time t6 and after that, the jump state ends due to a fall. The moving direction of the user character PB continues to be the left direction. The timing when the jump of the user character PB ends may be any time between the times t2 and t5. The timing when the user character PB starts jumping may be the timing when the user character PB starts moving in the left direction (the time t5).

As described above, in a case where a jump action involving a change of direction is performed, and if the velocity condition or the first direction condition is not satisfied, the first jump action is performed. In a case where the first jump action is performed, the user character PB decelerates under the influence of inertia over a predetermined time and then changes the moving direction.

Velocity Condition and First Direction Condition

Next, the velocity condition and the first direction condition are described. In the exemplary embodiment, the velocity condition is a condition regarding, if an input to the jump button is provided when the user character PB is in the hidden state, the moving velocity of the user character PB during a predetermined period set based on the time of the input to the jump button. The predetermined period may be, for example, a predetermined number of frame times (e.g., 10 to 20 frame times) in the past including the time of the input to the jump button, or may be the time of the input or a predetermined time in the past before the time of the input. The predetermined period may or may not include the time of the input to the jump button. Specifically, the velocity condition is satisfied when the maximum value of the moving velocity of the user character PB during the predetermined period is greater than or equal to a first threshold. For example, the first threshold may be 70 to 80% of the first velocity. The velocity condition may be satisfied in a case where the average velocity of the user character PB during the predetermined period is greater than or equal to the first threshold. The velocity condition may be satisfied in a case where the velocity of the user character PB during the predetermined period is always greater than or equal to the first threshold. That is, the velocity condition is a condition that is satisfied when the moving velocity of the user character PB is relatively fast at the time when or immediately before an input to the jump button is provided. The velocity condition is a condition that is not satisfied when the user character PB is not moving, or is moving at a slow velocity.

The first direction condition is a condition regarding, if an input to the jump button is provided when the user character PB is moving in the first direction in the hidden state, a direction operation input for moving the user character PB in the second direction different from the first direction. The first direction condition is satisfied when the difference between the first direction and the second direction is greater than or equal to a second threshold. That is, the first direction condition is satisfied in a case where a direction operation input to a direction largely away from the moving direction of the user character PB is provided. Specifically, when the user character PB is in the hidden state, and if an input to the jump button is provided, it is determined whether or not the difference between the direction of the velocity vector of the user character PB during a predetermined period set based on the time of the input to the jump button (here referred to as a "before-change-of-direction velocity vector"), and the moving direction of the user character PB set by a direction operation input at the time of the input to the jump button is greater than or equal to the second threshold. If the result of the determination is affirmative, the first direction condition is satisfied. For example, the second threshold may be 60 degrees, or may be 70 degrees. Here, the before-change-of-direction velocity vector may be a vector having the maximum size among velocity vectors at times during the predetermined period. The before-change-of-direction velocity vector may be the average of the velocity vectors at the times during the predetermined period. "The moving direction of the user character PB set by a direction operation input at the time of the input to the jump button" is the moving direction of the user character PB after the change of direction, and is the second direction. Specifically, "the moving direction of the user character PB set by a direction operation input at the time of the input to the jump button" is a direction in the virtual space relating to the orientation of the user character PB, the position of the virtual camera, and the input direction at the time of the input to the jump button, and is the moving direction in a case where the change of direction to the direction relating to the input direction is immediately completed at that time. "The predetermined period set based on the time of the input to the jump button" used to determine whether or not the first direction condition is satisfied may be the same as (completely match) or different from (partially overlap or may not overlap at all) the "predetermined period" used to determine whether or not the velocity condition is satisfied.

For example, as shown in FIG. 13, when the user character PB is moving in a positive X-axis direction, and if an input to the jump button is provided, and if a direction operation input for moving the user character PB in a negative X-axis direction (an input to the left direction of the analog stick 32) is provided at the time of the input to the jump button, the above difference is 180 degrees. In this case, the first direction condition is satisfied. That is, if a direction operation input for causing the user character PB to change direction to a direction opposite to the moving direction, the first direction condition is satisfied.

As shown in FIG. 12, for example, when the user character PB is moving in the positive X-axis direction, and if an input to the jump button is provided, and if a direction operation input for moving the user character PB in a positive Z-axis direction (an input to the up direction of the analog stick 32) is provided at the time of the input to the jump button, the above difference is 90 degrees. Also in this case, the first direction condition is satisfied. That is, also if a direction operation input for causing the user character PB to change direction to a direction immediately lateral to the moving direction, the first direction condition is satisfied.

If both the velocity condition and the first direction condition are satisfied, the second jump action is performed.

In accordance with the moving velocity of the user character PB during the predetermined period used to determine the velocity condition, the predetermined period used to determine the first direction condition, and a predetermined period different from these predetermined periods, the second threshold for satisfying the first direction condition may differ. For example, the faster the moving velocity of the user character PB during the predetermined period may be, the smaller the second threshold may be. In this case, when the user character PB is moving at a fast velocity, and even if a change in the input direction of the analog stick 32 is small, the first direction condition is satisfied, and the second jump action is performed. However, when the user character PB is moving at a slow velocity, and if a change in the input direction is not great, the first direction condition is not satisfied, and the second jump action is not performed. As described above, if a sufficient velocity is not reached, the second jump action is not performed. Consequently, when the user character is moving at high speed, and even if the user character changes direction at a small angle, it is possible to facilitate the execution of the second jump action. When the user character is moving at low speed, and if the user character changes direction at a large angle, it is possible to execute the second jump action.

At the time when an input to the jump button is provided, the amount of change in the velocity vector in the past may be calculated, and the second threshold for satisfying the first direction condition may be varied in accordance with the amount of change. For example, if the user character moves straight ahead for a certain period, the second threshold may be made small Consequently, if the input direction changes in the state where the user character PB is moving straight ahead, it is possible to facilitate the execution of the second jump action.

Second Jump Action

Figure 16:
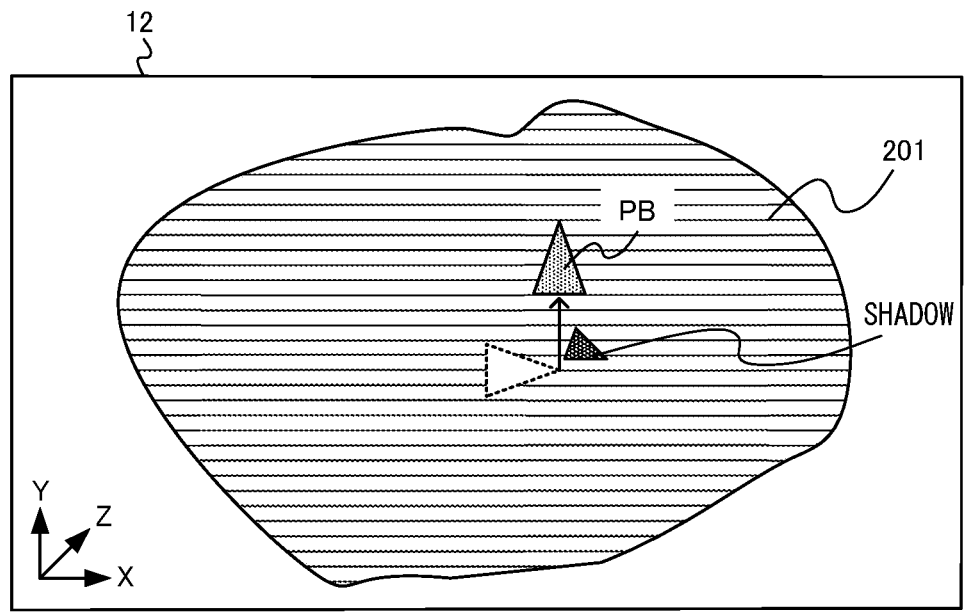
FIG. 16 is a diagram showing an example non-limiting trajectory of the user character PB in a case where a second jump action involving a change of direction to the depth direction is performed when the user character PB in the special state is moving in the right direction on the first state area 201 in the ground object 200.
Figure 17:
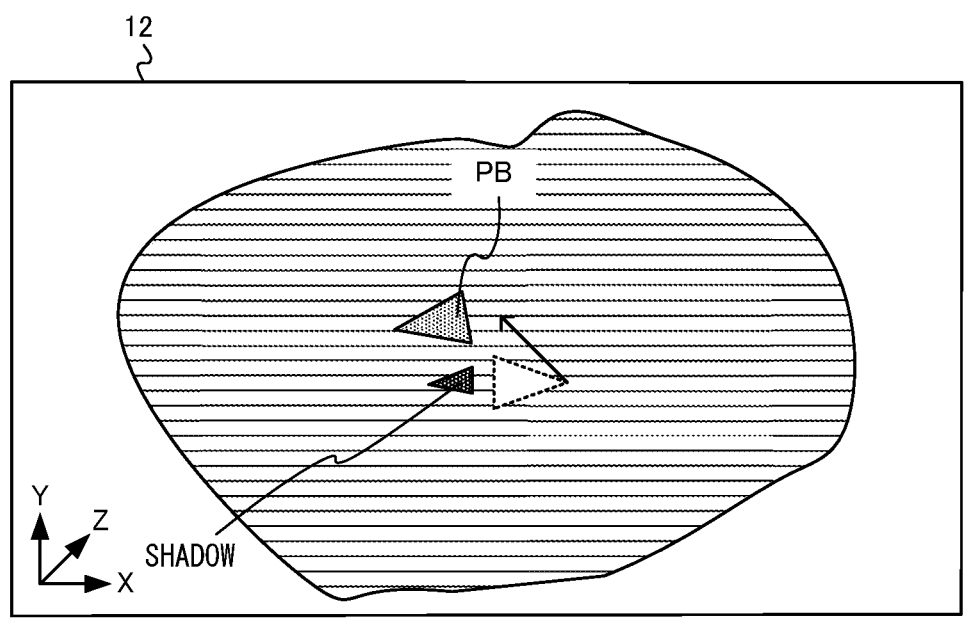
FIG. 17 is a diagram showing an example non-limiting trajectory of the user character PB in a case where the second jump action involving a change of direction to the left direction is performed when the user character PB in the special state is moving in the right direction on the first state area 201 in the ground object 200.

Next, the second jump action is described. FIG. 16 is a diagram showing an example of the trajectory of the user character PB in a case where the second jump action involving a change of direction to the depth direction is performed when the user character PB in the special state is moving in the right direction on the first state area 201 in the ground object 200. FIG. 17 is a diagram showing an example of the trajectory of the user character PB in a case where the second jump action involving a change of direction to the left direction is performed when the user character PB in the special state is moving in the right direction on the first state area 201 in the ground object 200. In FIGS. 16 and 17, for simplicity, the user character PB and the area 201 around the user character PB are displayed in an enlarged manner FIGS. 16 and 17 show images when the user character PB is jumping, in which the shadow of the user character PB is projected onto the ground and which represents the user character PB floating in the air.

As shown in FIG. 16, when the user character PB is moving in the right direction, and for example, if a direction operation input to the up direction is provided and the jump button is pressed, and if the velocity condition and the first direction condition are satisfied, the second jump action is performed. In the second jump action, the user character PB is not influenced by inertia as described above, and the change of direction of the user character PB is immediately completed. Specifically, the velocity in the right direction immediately becomes zero, and the moving direction of the user character PB immediately changes to the depth direction of the screen. With the change of direction to the depth direction, the user character PB jumps.

As shown in FIG. 17, when the user character PB is moving in the right direction while remaining in the hidden state, and for example, if a direction operation input to the left direction is provided and the jump button is pressed, and if the velocity condition and the first direction condition are satisfied, the second jump action is performed. Specifically, the moving direction of the user character PB immediately changes to the left direction. With the change of direction to the left direction, the user character PB jumps.

In a case where the second jump action is performed, the user character PB is in an attack influence reduction state for a predetermined time (e.g., 10 to 20 frame times). The attack influence reduction state is the state where the disadvantageous influence of the attack of the enemy character EC (the shooting of liquid or the like) is reduced. In a case where the user character P in the normal state or the special state is not in the attack influence reduction state, and if the user character P is attacked by the enemy character EC, the user character P is subject to disadvantageous influence. For example, the physical strength value of the user character P decreases, or the offensive strength of the user character P weakens, or the attack of the user character P stops, or the moving velocity of the user character P decreases, or the user character P retreats to a position further away from the position of the enemy side than the current position. In the attack influence reduction state, this disadvantageous influence is reduced. A method for reducing the disadvantageous influence in the attack influence reduction state may be any method. For example, in the attack influence reduction state, the physical strength value of the user character P may increase, or the defensive strength of the user character P may increase, or the offensive strength of the enemy character EC may decrease, or the attack of the enemy character EC may stop, whereby the influence on the user character P when the user character P is attacked may be reduced, or the user character P may not be influenced at all.

As shown in FIGS. 16 and 17, in the attack influence reduction state, the display form of the user character PB changes. For example, in the attack influence reduction state, the color of the user character PB may change, or an effect image indicating that the user character PB is in the attack influence reduction state may be added to the user character PB. In the attack influence reduction state, a sound effect indicating the attack influence reduction state may be output.

The attack influence reduction state may continue while the user character PB is jumping (i.e., while the user character PB is in the exposed state). The user character PB may be in the attack influence reduction state only during a first period (e.g., the first half period) of the period while the user character PB is jumping. The user character PB may be in the attack influence reduction state while the user character PB is jumping and during a predetermined period from when the user character PB changes to the hidden state again after the jump.

Figure 18:
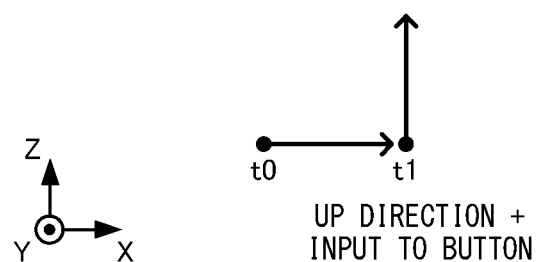
FIG. 18 is a diagram showing an example non-limiting change in the position of the user character PB and a velocity vector at this position in a case where the second jump action shown in FIG. 16 is performed.
Figure 19:
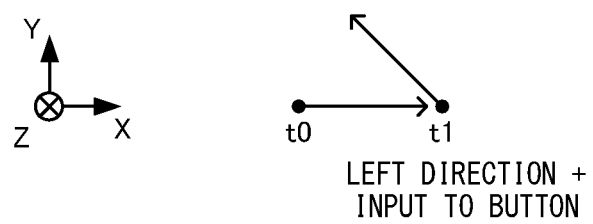
FIG. 19 is a diagram showing an example non-limiting change in the position of the user character PB and a velocity vector at this position in a case where the second jump action shown in FIG. 17 is performed.

FIG. 18 is a diagram showing examples of a change in the position of the user character PB and a velocity vector at this position in a case where the second jump action shown in FIG. 16 is performed. FIG. 19 is a diagram showing examples of a change in the position of the user character PB and a velocity vector at this position in a case where the second jump action shown in FIG. 17 is performed.

As shown in FIG. 18, at a time t0, a direction operation input to the right direction is provided, and the user character PB is moving in the right direction at a velocity satisfying the velocity condition (e.g., the first velocity). Suppose that at a time t1, a direction operation input to the up direction and an input to the jump button are provided, and the velocity condition and the first direction condition are satisfied. In this case, at the time t1, the user character PB completes the change of direction to the depth direction of the screen (the Z-axis direction) and also jumps. That is, in a case where the second jump action is performed, the time until the moving direction of the user character PB changes to the depth direction is shorter than in a case where the first jump action is performed. For example, in a case where the second jump action is performed, the change of direction is completed at the time when input to the jump button is provided. However, in a case where the first jump action is performed, the change of direction is completed when a certain time elapses from the time when the input to the jump button is provided.

The length of the velocity vector at a change-of-direction completion time "t1" in a case where the second jump action is performed is longer than the length of the velocity vector at a change-of-direction completion time "t5" in a case where the first jump action is performed. That is, in a case where the second jump action is performed, the moving velocity after the change of direction is faster than in a case where the first jump action is performed. For example, in a case where the second jump action is performed, the velocity at the change-of-direction completion time t1 may be the same as the velocity at the time t0 before the change of direction. The velocity at the change-of-direction completion time t1 may be set to the maximum velocity during the predetermined period set based on the time of the input to the jump button, or may be set to the average velocity during the predetermined period. As described above, in a case where the second jump action is performed, the moving velocity of the user character PB after the change of direction is maintained at the moving velocity of the user character PB before the change of direction. That is, in a case where the second jump action is performed, the user character PB jumps with the change of direction without decreasing the velocity. Consequently, it is possible to quickly change the moving direction of the user character PB and also make the velocity after the movement fast. For example, it is possible to make it easy to avoid the attack of the enemy character EC. During the second jump action, a decrease in the moving velocity may be smaller than during the first jump action. Alternatively, during the second jump action, the moving velocity may not decrease.

As shown in FIG. 19, suppose that when the user character PB is moving in the right direction, at a time t1, a direction operation input to the left direction and an input to the jump button are provided, and the velocity condition and the first direction condition are satisfied. In this case, at the time t1, the user character PB completes the change of direction to the left direction and also jumps. In a case where the second jump action is performed, the time until the moving direction of the user character PB changes to the left direction is shorter than in a case where the first jump action is performed. In a case where the second jump action is performed, the moving velocity after the change of direction is faster than in a case where the first jump action is performed.

As described above, in the second jump action, the user character PB can sharply change direction, and the velocity after the change of direction is fast. Thus, the user character PB is more advantageous than in a case where the first jump action is performed. If the second jump action is performed, the user character PB is in the attack influence reduction state and becomes advantageous.

Incidentally, if the second jump action is performed in succession, the user character PB may quickly change direction and be in the attack influence reduction state in succession, and the user character PB may become too advantageous. Thus, in a case where the second jump action is performed in succession within a predetermined time, the moving velocity of the user character PB after the change of direction may be restricted. For example, after the second jump action is performed, and if the second jump action is performed again within a predetermined time (e.g., 90 frame times), the velocity of the user character PB after the change of direction is decreased. For example, in a case where the second jump action is not performed in succession, as described above, the moving velocity after the change of direction is maintained at the moving velocity before the change of direction. On the other hand, in a case where the second jump action is performed in succession, the moving velocity after the change of direction may be set to a value obtained by multiplying "the moving velocity before the change of direction" calculated as described above by a predetermined attenuation rate. In a case where the second jump action is not performed in succession, the moving velocity after the change of direction may be set to the first velocity. In a case where the second jump action is performed in succession, the moving velocity after the change of direction may be set to a velocity smaller than the first velocity. Every time the second jump action is performed in succession, the moving velocity after the change of direction may decrease. As described above, the moving velocity after the change of direction decreases, whereby the user character PB becomes disadvantageous. Thus, it is possible to prevent the user from performing the second jump action in succession. The moving velocity after the change of direction decreases, whereby the velocity condition cannot be satisfied. Thus, it is possible to prevent the second jump action from being performed in the first place.

As described above, in the exemplary embodiment, when the user character PB is moving in the first direction, and if the jump button is pressed and a direction operation input for moving the user character PB in the second direction is provided, and if the velocity condition and the first direction condition are satisfied, the second jump action is performed. In a case where the second jump action is performed, the user character PB immediately changes direction and jumps.

Consequently, it is possible to cause the user character PB to immediately change direction. In a case where the velocity condition is satisfied, the second jump action can be performed. Thus, it is possible to promote the movement of the user character PB at a fast velocity in the moving direction. The second jump action is performed when a change of direction to a direction away from the moving direction is made. Thus, for example, when the user character PB is moving toward the enemy side, it is possible to quickly move the user character PB in a direction opposite to the moving direction, where necessary. Thus, it is possible to avoid the attack of the enemy. In a case where the second jump action is performed, the user character PB is in the attack influence reduction state. Thus, it is possible to reduce the attack of the enemy when the user character PB escapes from the enemy. The attack influence reduction state ends in a short time. Thus, it is possible to prevent the user having performed the second jump action from becoming too advantageous. In a case where the second jump action is performed in succession within a predetermined time, the velocity after the change of direction becomes slow. Thus, it is possible to prevent the second jump action from being performed in succession. Thus, it is possible to prevent the user character PB from becoming too advantageous.

Jump Action on Wall Surface

Next, a jump action on the wall surface object 210 is described. As described above, the user character PB in the special state can move on the first state area 201 in the wall surface object 210. The user character PB in the special state can also perform a jump action on the wall surface object 210. Specifically, when the user character PB in the special state is present on the wall surface object 210, and if an input to the jump button is provided, and if a second direction condition is satisfied, the user character PB performs a third jump action. Similarly to the second jump action, the third jump action is a jump action in which the user character PB can quickly change direction, and is a jump action in which the user character PB is temporarily in the attack influence reduction state. When the user character PB in the special state is present on the wall surface object 210, and if an input to the jump button is provided, and if the second direction condition is not satisfied, the user character PB can perform a normal jump action along the wall surface. When the user character PB in the special state is present on the wall surface object 210, and if a long-press input to the jump button is provided, the user character PB performs a wall climbing action described below.

Figure 20:
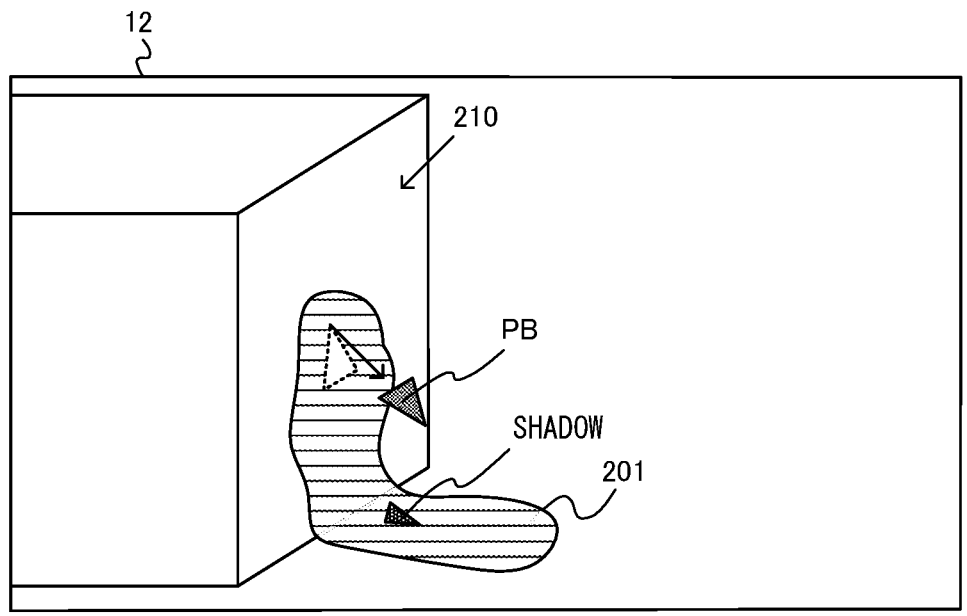
FIG. 20 is a diagram showing an example non-limiting state where the user character PB in the special state performs a third jump action on the wall surface object 210.

FIG. 20 is a diagram showing an example of the state where the user character PB in the special state performs the third jump action on the wall surface object 210.

As shown in FIG. 20, when the user character PB in the special state is present on the first state area 201 on the wall surface object 210, and if an input to the jump button is provided, and if the second direction condition is satisfied, the third jump action is performed. The second direction condition is satisfied in a case where a direction operation input to a direction away from the wall surface object 210 is provided. Based on the direction operation input and a direction normal to the wall surface object 210 at the time when the input to the jump button is provided, it is determined whether or not the second direction condition is satisfied. Specifically, if the angle between the input direction of the analog stick 32 and the direction of a normal vector of the wall surface object 210 viewed from the virtual camera at the time when the input to the jump button is provided is less than or equal to a threshold (e.g., 60 degrees), the second direction condition is satisfied.

Figure 21:
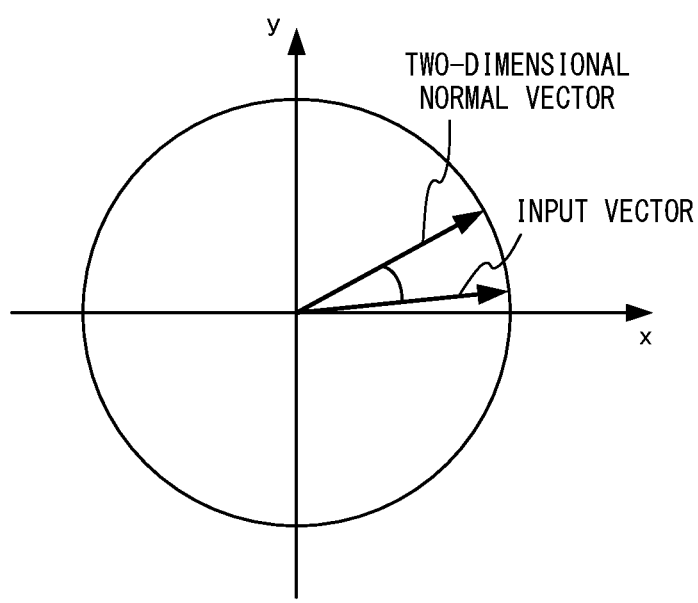
FIG. 21 is a non-limiting diagram illustrating a second direction condition.

FIG. 21 is a diagram illustrating the second direction condition. As shown in FIG. 21, the input direction of the analog stick is represented as an input vector in an xy-coordinate system. An x-axis direction indicates an input of the right direction, and a y-axis direction indicates an input of the up direction. A "two-dimensional normal vector" in FIG. 21 is "the direction of the normal vector of the wall surface object 210 viewed from the virtual camera". For example, the two-dimensional normal vector is a vector obtained by projecting a three-dimensional normal vector of the wall surface object 210 in the virtual space onto a plane perpendicular to the direction of the line of sight of the virtual camera (a projection plane). If the angle between the input vector and the two-dimensional normal vector is less than or equal to a predetermined value, the second direction condition is satisfied. For example, in a case where a wall surface object is displayed on the left side of the screen, and the user character PB in the special state is located on the wall surface object, and if the right direction of the analog stick 32 is input, the normal vector of the wall surface object and the input vector are directed in the same direction. In this case, the second direction condition is satisfied. In a case where a wall surface object is present in front of the virtual camera and the user character PB in the special state is present on the wall surface object, and if the down direction of the analog stick 32 is input, the second direction condition is satisfied.

As shown in FIG. 20, if the third jump action is performed, the user character PB jumps in a direction away from the wall surface object 210. At this time, the user character PB is temporarily in the attack influence reduction state. The continuation time of the attack influence reduction state involved in the third jump action may be the same as or different from the continuation time (e.g., 10 to 20 frame times) of the attack influence reduction state involved in the second jump action.

When the user character PB is moving in a first direction on the wall surface object 210, and if the third jump action is performed, similarly to the second jump action, the movement in the first direction is not decelerated, and the user character PB immediately starts moving in a direction away from the wall surface object 210. That is, the user character PB immediately changes direction in the direction away from the wall surface. Also in a case where the third jump action is performed, similarly to a case where the second jump action is performed, the velocity of the user character PB after the change of direction is set to the velocity of the user character PB before the change of direction. For example, when the user character PB is moving in the up direction on the wall surface object 210 present in front of the screen, and if an input to the down direction is provided with an input to the jump button, the movement in the up direction is not decelerated, and the user character PB starts moving in a direction away from the wall surface object 210. In a case where the third jump action is performed, the velocity of the user character PB after the change of direction (the velocity of the user character PB when the user character PB jumps in a direction away from the wall surface) may be a certain velocity without depending on the velocity of the user character PB before the change of direction. This certain velocity may be the same as a second velocity, or faster than the second velocity, or slower than the second velocity.

In contrast, although not shown in the figures, when the user character PB is moving in the first direction on the wall surface object 210, and even if a direction operation input is provided with an input to the jump button, but if the input direction does not satisfy the second direction condition, the third jump action is not performed. In this case, the user character PB performs the normal jump action on the wall surface. Specifically, when the user character PB is present on the wall surface object 210, and if the jump button is short-pressed (released in a short time after being pressed), the user character PB moves by a predetermined distance while remaining in the hidden state in the input direction and a direction along the wall surface object 210. When the user character PB is present on the wall surface object 210, and if the jump button is long-pressed, the user character PB performs a wall climbing action. The wall climbing action is described below.

Wall Climbing Action

The wall climbing action is an action in which the user character PB climbs the wall surface object 210 at high speed. The wall climbing action is performed in a case where the jump button is released after the jump button is long-pressed when the user character PB is present on the wall surface object 210. Before the wall climbing action is performed, the user character PB performs a preliminary action. The preliminary action can be regarded as an action for charging the force to perform the wall climbing action. The longer the time of the preliminary action is, the more force is accumulated, and the faster the moving velocity is when the wall climbing action is performed.

Figure 22:
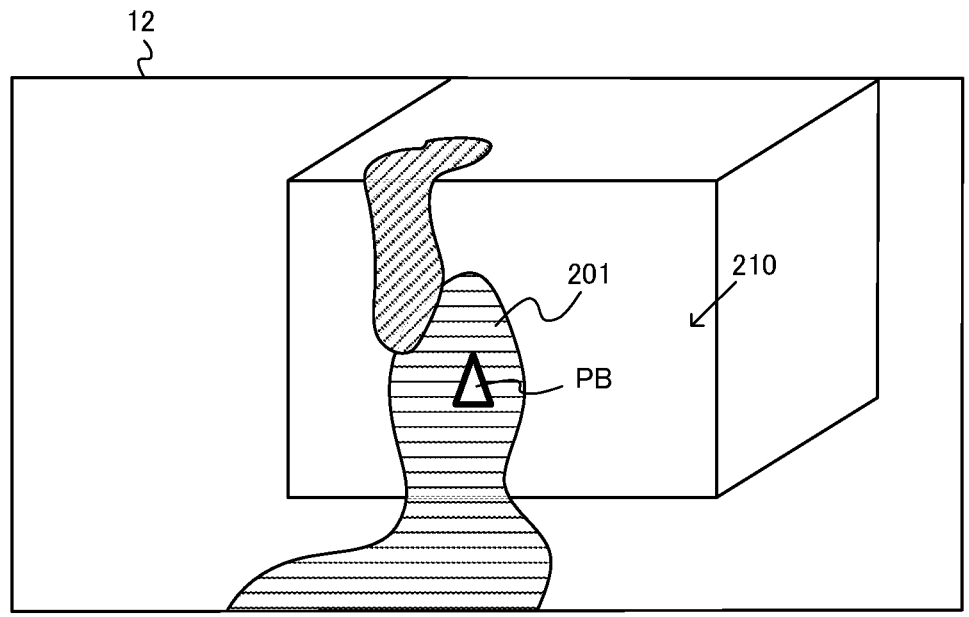
FIG. 22 is a diagram showing an example non-limiting state where the user character PB performs a preliminary action before performing a wall climbing action.
Figure 23:
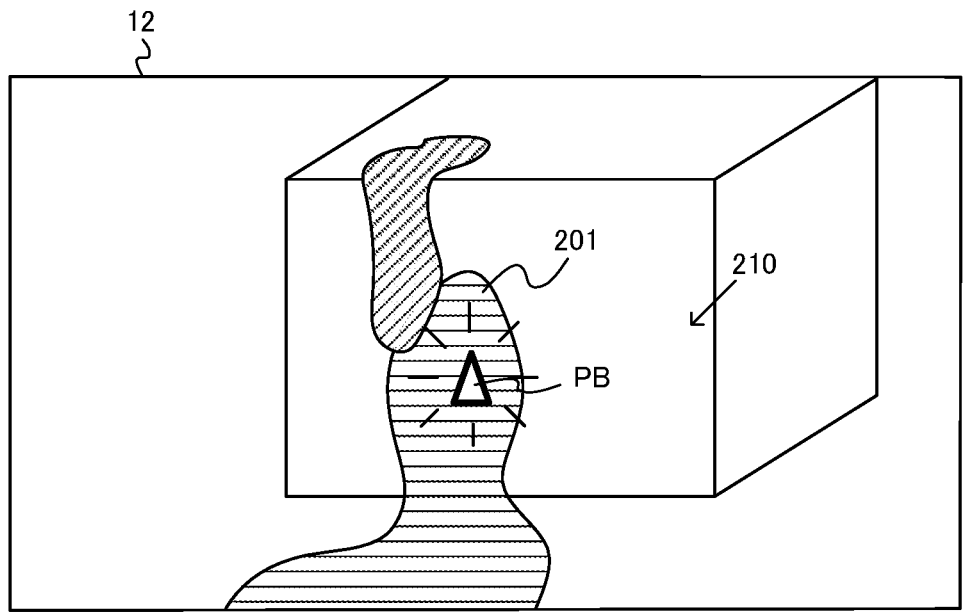
FIG. 23 is a diagram showing example non-limiting charge completion representation when the preliminary action is performed for a predetermined time.

FIG. 22 is a diagram showing an example of the state where the user character PB performs the preliminary action before performing the wall climbing action. FIG. 23 is a diagram showing an example of charge completion representation when the preliminary action is performed for a predetermined time.

As shown in FIG. 22, when the user character PB is present on the wall surface object 210, and while the jump button is being long-pressed, the user character PB performs the preliminary action. During the preliminary action, the display form of the user character PB is such that the user character PB is easier to visually confirm than in the hidden state. Thus, during the preliminary action, the user character PB is also easy for (the user relating to) the enemy character EC to visually confirm. For example, during the preliminary action, the display form of the user character PB is such that a part of the user character PB stands out from liquid. While the user character PB is performing the preliminary action, an effect image is displayed that indicates that it is during the preliminary action. Thus, the user character PB is easy to visually confirm. Here, the display form of the user character PB of which the visibility is high during the preliminary action is occasionally referred to as a "preliminary action form". In FIG. 22, the user character PB in the preliminary action form is displayed as a bold triangle. The same applies to other figures. During the preliminary action, the user character PB is in the preliminary action form, and a sound effect may also be output.

If a direction operation input is provided using the analog stick 32 during the preliminary action, the user character PB moves in the input direction on the wall surface object 210. The moving velocity of the user character PB, however, is slower than when the user character PB does not perform the preliminary action. Specifically, the longer time elapsed since the preliminary action has been started is, the slower the moving velocity of the user character PB when a direction operation input is provided is. During the preliminary action, the downward moving velocity due to gravity becomes slow. The longer the time elapsed since the preliminary action has been started is, the slower the downward moving velocity due to gravity is.

As shown in FIG. 23, if a predetermined time elapses since the preliminary action has been started, charge completion representation is performed. For example, in the charge completion representation, the color or the shape of the user character PB may change, or an effect image may be added to the user character PB, or a sound effect may be output. Also after the charge completion representation, the user character PB continues the preliminary action so long as the long-pressing of the jump button continues. During the preliminary action after the charge completion representation, the user character PB falls slightly downward under the influence of gravity. During the preliminary action after the charge completion representation, the user character PB may not fall downward under the influence of gravity. During the preliminary action after the charge completion representation, the user character PB moves at low speed on the wall surface object 210 in accordance with a direction operation input.

Figure 24:
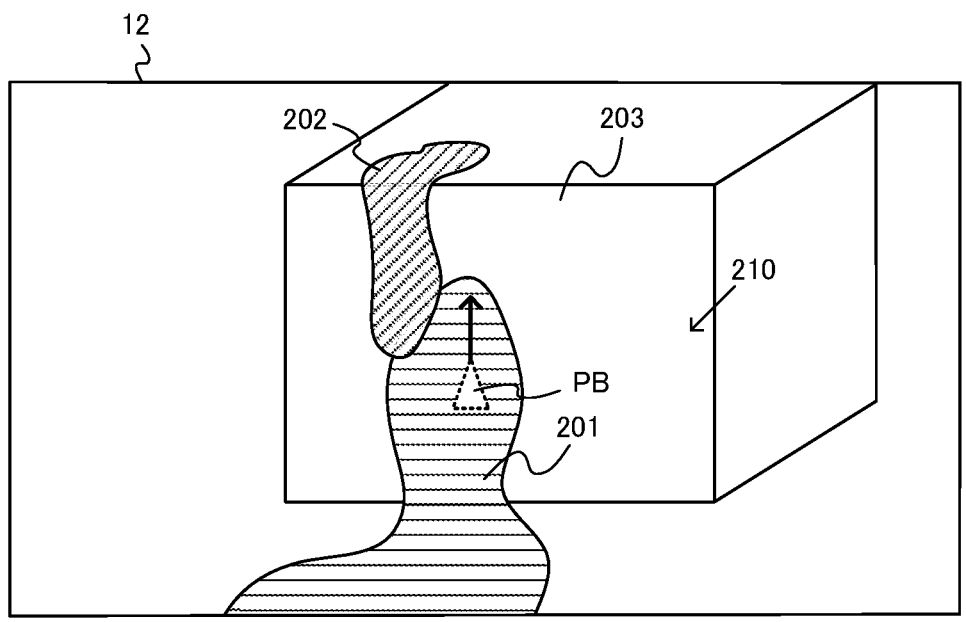
FIG. 24 is a diagram showing an example non-limiting state where the user character PB starts the wall climbing action after the long-pressing of a jump button is released.
Figure 25:
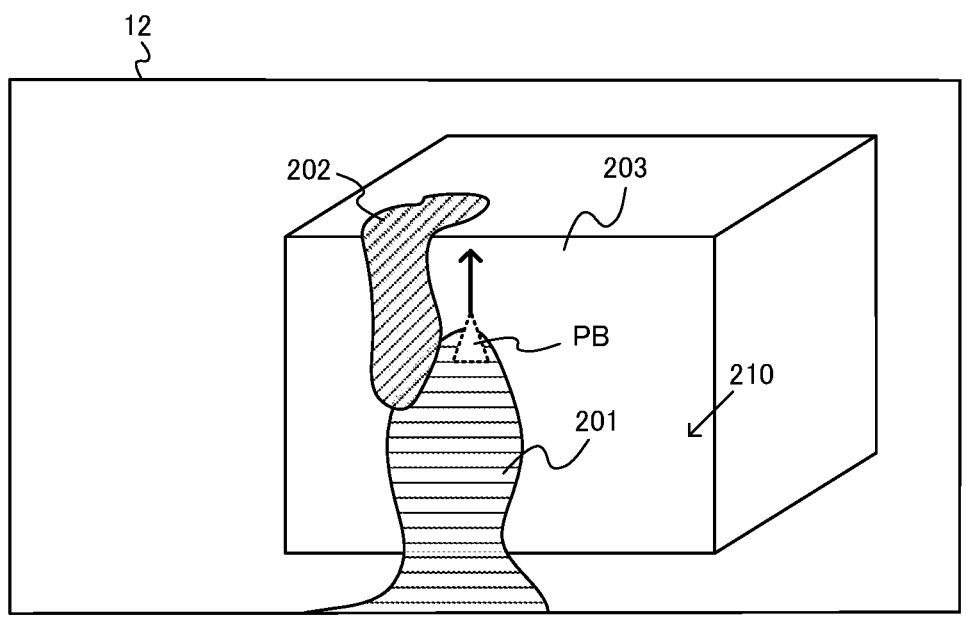
FIG. 25 is a diagram showing an example non-limiting state where the user character PB reaches the boundary of the first state area 201 during the wall climbing action.
Figure 26:
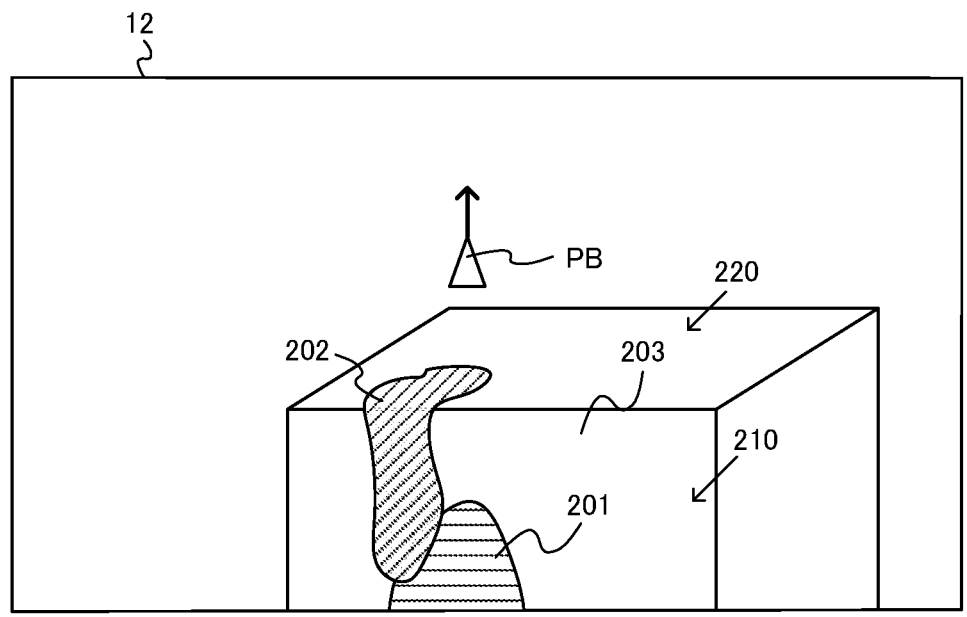
FIG. 26 is a diagram showing an example non-limiting state where the user character PB jumps high upward beyond the boundary of the first state area 201 after FIG. 25.
Figure 27:
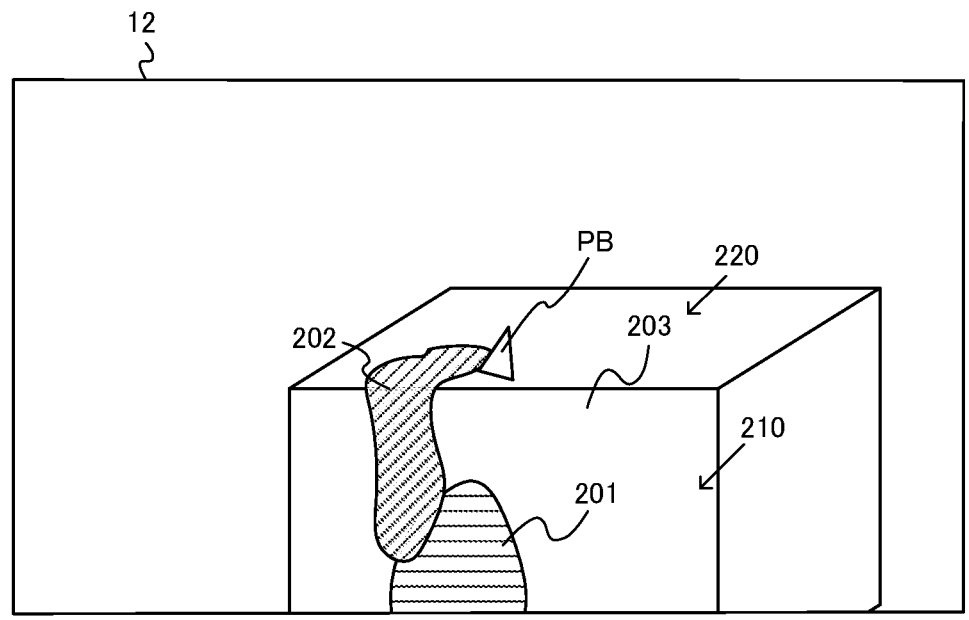
FIG. 27 is a diagram showing an example non-limiting case where the user character PB lands on an upper surface 220 after FIG. 26.

Next, with reference to FIGS. 24 to 27, a description is given of an example of the wall climbing action after the user character PB performs the preliminary action. FIG. 24 is a diagram showing an example of the state where the user character PB starts the wall climbing action after the long-pressing of the jump button is released. FIG. 25 is a diagram showing an example of the state where the user character PB reaches the boundary of the first state area 201 during the wall climbing action. FIG. 26 is a diagram showing an example of the state where the user character PB jumps high upward beyond the boundary of the first state area 201 after FIG. 25. FIG. 27 is a diagram showing an example of the state where the user character PB lands on an upper surface 220 after FIG. 26.

As shown in FIG. 24, after the charge completion representation is performed, in accordance with the release of the jump button, the user character PB moves on the first state area 201 in the wall surface object 210. The moving velocity of the user character PB in this case is a second velocity faster than the first velocity. Specifically, when the jump button is released, and for example, if a direction operation input to the up direction is provided using the analog stick 32, the user character PB moves at the second velocity in the up direction on the first state area 201 in the wall surface object 210. While the direction operation input to the up direction continues, the moving velocity of the user character PB is maintained at the second velocity. An action in which the user character PB moves in the up direction on the first state area 201 in the wall surface object 210 in accordance with the release of the long-pressing of the jump button is referred to as a "wall climbing action". During the wall climbing action, for example, if the input direction of the analog stick 32 changes to the diagonally upper right direction, the user character PB changes the moving direction to the diagonally upper right direction while maintaining the moving velocity. That is, during the wall climbing action, the user character PB moves at the second velocity in a direction relating to the input direction of the analog stick 32.

During the wall climbing action, if the input to the up direction ends, the wall climbing action ends. Specifically, if an up direction component of the input direction of the analog stick 32 becomes "0", the user character PB decelerates, and the processing returns to control on the normal wall surface object 210 as shown in FIG. 10.

When the jump button is released, and if the second direction condition is satisfied, the third jump action described with reference to FIG. 20 is performed.

After the wall climbing action is started, and if the input to the up direction continues, the user character PB moves at the second velocity to the boundary between the first state area 201 in the wall surface object 210 and an area different from the area 201. For example, as shown in FIG. 25, the user character PB moves to the boundary between the first state area 201 and the initial state area 203. Or if a boundary is formed between the first state area 201 and the second state area 202, the user character PB moves to this boundary.

As shown in FIG. 26, after the user character PB reaches the above boundary, the user character PB jumps from the boundary and moves upward in the virtual space beyond the boundary. The user character PB having been moving at the second velocity jumps high to swiftly fly out beyond the boundary due to inertia. Here, an action in which the user character PB jumps beyond the boundary by the wall climbing action is occasionally referred to as a "fourth jump action". The direction in which the user character PB flies out from the boundary depends on the input direction of the analog stick 32 at that time, and the initial velocity of the user character PB when the user character PB flies out is the second velocity, which is the same as during the wall climbing action.

When the user character PB flies out from the boundary, the user character PB is in the attack influence reduction state. The continuation time of the attack influence reduction state involved in the wall climbing action may be longer than or the same as the continuation time of the attack influence reduction state involved in the second jump action. For example, the continuation time of the attack influence reduction state involved in the wall climbing action may be 40 to 50 frame times. The attack influence reduction state may be set at the timing when the jump button is released. The attack influence reduction state may be set during the wall climbing action.

After the user character PB swiftly flies out from the boundary, the user character PB moves upward in the virtual space to the highest point and then falls downward due to gravity. For example, as shown in FIG. 27, the user character PB falls onto the upper surface 220 above the wall surface object 210 (a surface parallel to the ground object 200).

After the long-pressing of the jump button is started, and if the jump button is released before the charge completion representation is performed, the wall climbing action is performed. However, the moving velocity of the user character PB during the wall climbing action and when the user character PB reaches the above boundary is slower than the second velocity. Also in this case, when the user character PB reaches the boundary, the user character PB is in the attack influence reduction state. Specifically, the longer the continuation time of the long-pressing of the jump button (the continuation time of the preliminary action) is, the faster the moving velocity of the user character PB during the wall climbing action is. If the continuation time of the long-pressing reaches a predetermined time, the charge completion representation is performed. The moving velocity of the user character PB during the wall climbing action is the second velocity, which is the maximum velocity. If the jump button is released before the charge completion representation is performed, the velocity of the user character PB when the user character PB reaches the boundary of the area 201 is slower than the second velocity (may be slower than the first velocity depending on the time of the preliminary action). Thus, even if the user character PB jumps beyond the boundary, the user character PB can jump only to a position lower than the above highest point. The time in which the attack influence reduction state continues may differ depending on whether or not the charge completion representation is performed, or may be the same. In a case where the long-pressing of the jump button is released before the charge completion representation is performed, the time in which the attack influence reduction state continues may differ in accordance with the time of the preliminary action, or may be the same. For example, the longer the time of the preliminary action is, the longer the time in which the attack influence reduction state continues may be.

During the preliminary action and during the wall climbing action, if the user character P returns from the special state to the normal state (if the ZL-button 39 is released), the preliminary action and the wall climbing action are interrupted, and the user character P falls from the wall surface object 210. When the user character PB is in the attack influence reduction state, and if the user character P returns from the special state to the normal state, the attack influence reduction state also ends.

As described above, the user character PB is caused to perform the wall climbing action, whereby it is possible to cause the user character PB to swiftly fly out from the boundary of the first state area 201 on the wall surface, and cause the user character PB to jump higher. Consequently, even if the wall surface object 210 is not changed to the first state up to an upper area of the wall surface object 210, it is possible to move the user character PB upward. The user character PB flies out high, thereby changing to the exposed state. The user character PB, however, changes to the attack influence reduction state. Thus, it is possible to avoid the state where the user character PB is disadvantageous. The time when the user character PB is in the attack influence reduction state is limited. Thus, it is possible to prevent the user character PB from becoming extremely too advantageous.

Data Used in Game Processing

Figure 28:
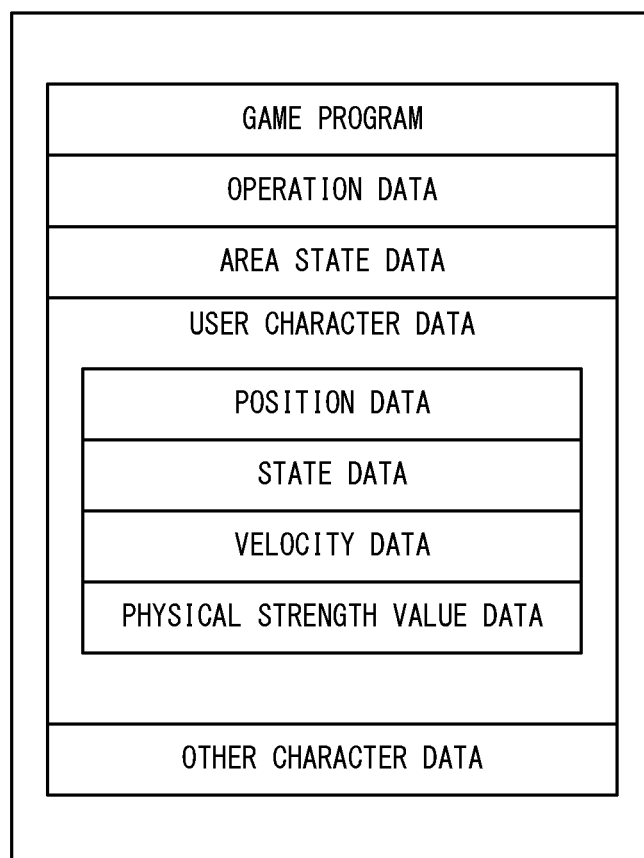
FIG. 28 is a diagram showing example non-limiting data stored in an information processing system 1.

Next, data used in the game processing is described. FIG. 28 is a diagram showing an example of data stored in the information processing system 1. During the execution of the game processing, the data shown in FIG. 28 is mainly stored in the DRAM 85 of the main body apparatus 2. The information processing system 1 stores various pieces of data in addition to these pieces of data.

As shown in FIG. 28, the information processing system 1 stores a game program, operation data, area state data, user character data, and other character data.

The game program is a game program for executing the game processing described below. The game program is stored in advance in a storage medium attached to the slot 23 or the flash memory 84 and is loaded into the DRAM 85 when the game is executed.

The operation data is data relating to operation inputs to the buttons, the analog sticks, and the like of the left controller 3 and the right controller 4. The operation data is transmitted from the left controller 3 and the right controller 4 to the main body apparatus 2 at predetermined time intervals (e.g., 1/200 second intervals).

The area state data is data that stores the state of each of the surfaces of the terrain objects (the ground object 200, the wall surface object 210, and the like) in the virtual space. The area state data indicates whether the area of each of the surfaces of the terrain objects is in the first state, the second state, or the initial state.

The user character data is data regarding the user character P relating to the user of the main body apparatus 2. The user character data includes position data, state data, velocity data, and physical strength value data. The position data is data indicating the position of the user character P in the virtual space. The state data includes data indicating whether the user character P is in the normal state or the special state. The state data includes data indicating whether the user character P is in the hidden state or the exposed state. The state data includes data indicating whether or not the user character P is in the attack influence reduction state.

The velocity data is data indicating the moving velocity and the moving direction of the user character P and data indicating velocity vectors. The velocity data includes velocity vectors at the current moment and in a predetermined number of frames in the past.

The physical strength value data is data indicating the current physical strength value of the user character P. If the user character P is attacked by the enemy character EC, the physical strength value decreases.

The other character data is data regarding a character relating to a user of an apparatus different from the main body apparatus 2 and includes data regarding each character of the user's team and data regarding each character of the enemy team. Similarly to the user character data, the other character data includes position data, state data, velocity data, and physical strength value data. For example, the main body apparatus 2 receives the other character data from another apparatus via the Internet. Based on the received other character data, the main body apparatus 2 controls each character of the user's team and each character of the enemy team.

Details of Game Processing Performed by Main Body Apparatus

Figure 29:
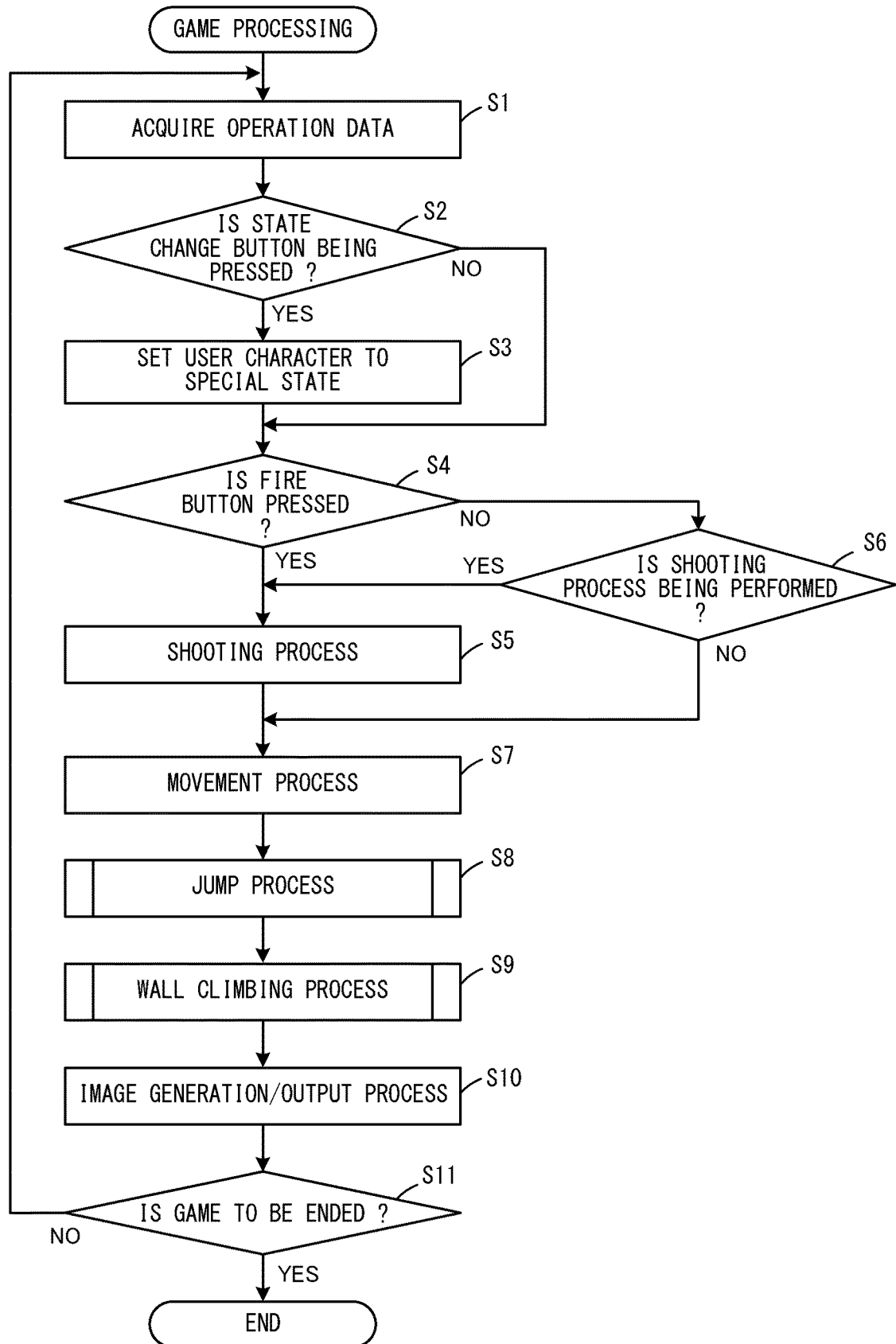
FIG. 29 is a flow chart showing example non-limiting game processing performed by the main body apparatus 2.

Next, the details of the game processing performed by the main body apparatus 2 are described. FIG. 29 is a flow chart showing an example of the game processing performed by the main body apparatus 2. The game processing shown in FIG. 29 is performed by the processor 81 of the main body apparatus 2 executing the game program. The processor 81 repeatedly performs the processes of steps S1 to S11 at predetermined time intervals (e.g., 1/60 second intervals).

In step S1, the processor 81 acquires the operation data output from the left controller 3 and the right controller 4. After step S1, step S2 is executed.

In step S2, based on the acquired operation data, the processor 81 determines whether or not a state change button (e.g., the ZL-button 39) for changing the user character P to the special state is being pressed. If the determination is YES in step S2, next, the process of step S3 is performed. If the determination is NO in step S2, next, the process of step S4 is performed.

In step S3, the processor 81 sets the user character P to the special state. In a case where the user character P is set to the special state, and if the user character P is located on the first state area 201, the processor 81 sets the user character P to the hidden state. Specifically, the processor 81 sets data relating to each state in the state data of the user character data stored in the DRAM 85.

In step S4, based on the acquired operation data, the processor 81 determines whether or not the fire button (e.g., the ZR-button 61) for causing the user character P to shoot liquid is pressed. If the determination is YES in step S4, next, the process of step S5 is performed. If the determination is NO in step S4, next, the process of step S6 is performed.

In step S5, the processor 81 performs a liquid shooting process. Specifically, if the fire button is pressed, the processor 81 starts the shooting of liquid in a color relating to the team of the user character P in the direction of the line of sight of the virtual camera (a direction specified by the user). If the shooting of the liquid is started, the user character P is in the state where the shooting process is being performed for a plurality of frame times. The shooting process started in accordance with a single pressing of the fire button is repeatedly performed over a plurality of frame times, whereby the state where the user character P shoots the liquid is displayed, and the state where the surface of a terrain object is painted over with the liquid is also displayed. When the user character P is in the special state, and if the fire button is pressed, the user character P returns to the normal state, shoots the liquid, and changes to the state where the shooting process is being performed. If the shooting process ends, and if the state change button is being pressed, the user character P changes to the special state. After the fire button is pressed, and if the state change button is pressed, the user character P ends the state where the shooting process is being performed (ends the shooting of the liquid in the middle), and changes to the special state. In the state where the fire button is pressed, if the state change button is pressed and then released, the user character P stops changing to the special state and shoots the liquid. That is, the button pressed last between the fire button and the state change button is reflected on the processing. The processor 81 updates the area state data stored in the DRAM 85, thereby changing a specified area (an area in a predetermined range relating to the direction in which the liquid is shot) to the first state. Consequently, an area specified by the user in a terrain object in the virtual space is changed to the first state.

In step S6, the processor 81 determines whether or not the liquid shooting process is being performed. If the determination is YES in step S6, next, the process of step S5 is performed. If the determination is NO in step S6, next, the process of step S7 is performed.

In step S7, the processor 81 performs a movement process on the user character P. Specifically, the processor 81 performs different processes depending on whether or not the user character P is in the special state, whether or not the user character P is located on the first state area 201, and whether or not the user character P is located on the wall surface. The determination of whether or not the user character P is located on the wall surface is made in accordance with the angle between a surface on which the user character P is located and the XZ-plane in the virtual space. If this angle is greater than or equal to a predetermined value (e.g., 60 degrees), it is determined that the user character P is located on the wall surface. For example, in a case where the user character P is in the normal state, and if the user character P is located on the first state area 201 or the initial state area 203 on the ground (a surface at an angle less than a predetermined value to the XZ-plane), the processor 81 moves the user character P at the normal velocity in a direction in the virtual space relating to a direction operation input. In a case where the user character P is in the normal state, and if the user character P is located on the second state area 202 on the ground, the processor 81 moves the user character P at a velocity slower than the normal velocity in a direction relating to a direction operation input. In a case where the user character P is in the special state, and if the user character P is located on the first state area 201 on the ground or the wall surface, the processor 81 moves the user character P at the first velocity in a direction in the virtual space relating to a direction operation input.

In the movement process, when the user character P is moving in the first direction, and if a direction operation input for moving the user character P in the second direction different from the first direction is provided, the processor 81 causes the user character P to change direction to the second direction over a plurality of frame times. A process related to the change of direction is performed regardless of whether the user character P is in the normal state, the special state, or the hidden state. For example, when the user character P is moving in the right direction of the screen, and a direction operation input for moving the user character P in the left direction is provided using the analog stick 32, a change of direction to the left direction is not immediately made, and after the moving velocity in the right direction is decreased, the change of direction to the left direction is made (the movement in the left direction is started). For example, the processor 81 adds a velocity vector relating to the latest direction operation input to the current velocity vector of the user character P, thereby calculating the latest velocity vector of the user character P. Then, the processor 81 moves the user character P in the virtual space in accordance with the calculated velocity vector. Consequently, when the user character P is moving in the first direction, and if a direction operation input for moving the user character P in the second direction is provided, the moving direction of the user character P changes from the first direction to the second direction over a plurality of frame times. For example, if the difference between the first direction and the second direction is relatively great, the time until the change of direction to the second direction is completed is long.

In the movement process, the user character PB is moved downward under the influence of gravity. For example, if the user character P is present in the air, a downward gravitational acceleration acts, and the user character P falls downward. In a case where the user character PB is present on the wall surface, the downward fall velocity is slower than in a case where the user character PB is present in the air.

In step S8, the processor 81 performs a jump process. The jump process in step S8 is a process for causing the user character P to perform the first jump action, the second jump action, and the third jump action described above in accordance with the pressing of the jump button. The details of the jump process will be described below. After step S8, step S9 is executed.

In step S9, the processor 81 performs a wall climbing process. The wall climbing process in step S9 is a process for causing the user character P to perform the preliminary action and the wall climbing action described above in accordance with the long-pressing of the jump button. The details of the wall climbing process will be described below. After step S9, step S10 is executed.

In step S10, the processor 81 performs an image generation/output process. Specifically, the processor 81 generates a game image based on the virtual camera and outputs the game image to the display device. After step S10, step S11 is executed.

In step S11, the processor 81 determines whether or not the game processing is to be ended. For example, if a predetermined time elapses since the game has been started, or if the user gives an instruction to end the game, the processor 81 ends the game processing. If the result of the determination is NO in step S11, the process of step S1 is performed again.

In the game processing, in addition to these processes, various processes such as the process of receiving data regarding another character from another apparatus, a process regarding the action of another character, a process when the user character P is attacked by the enemy character EC, and a process when the user character P attacks the enemy character EC are performed, but are not described here.

Jump Process

Figure 30:
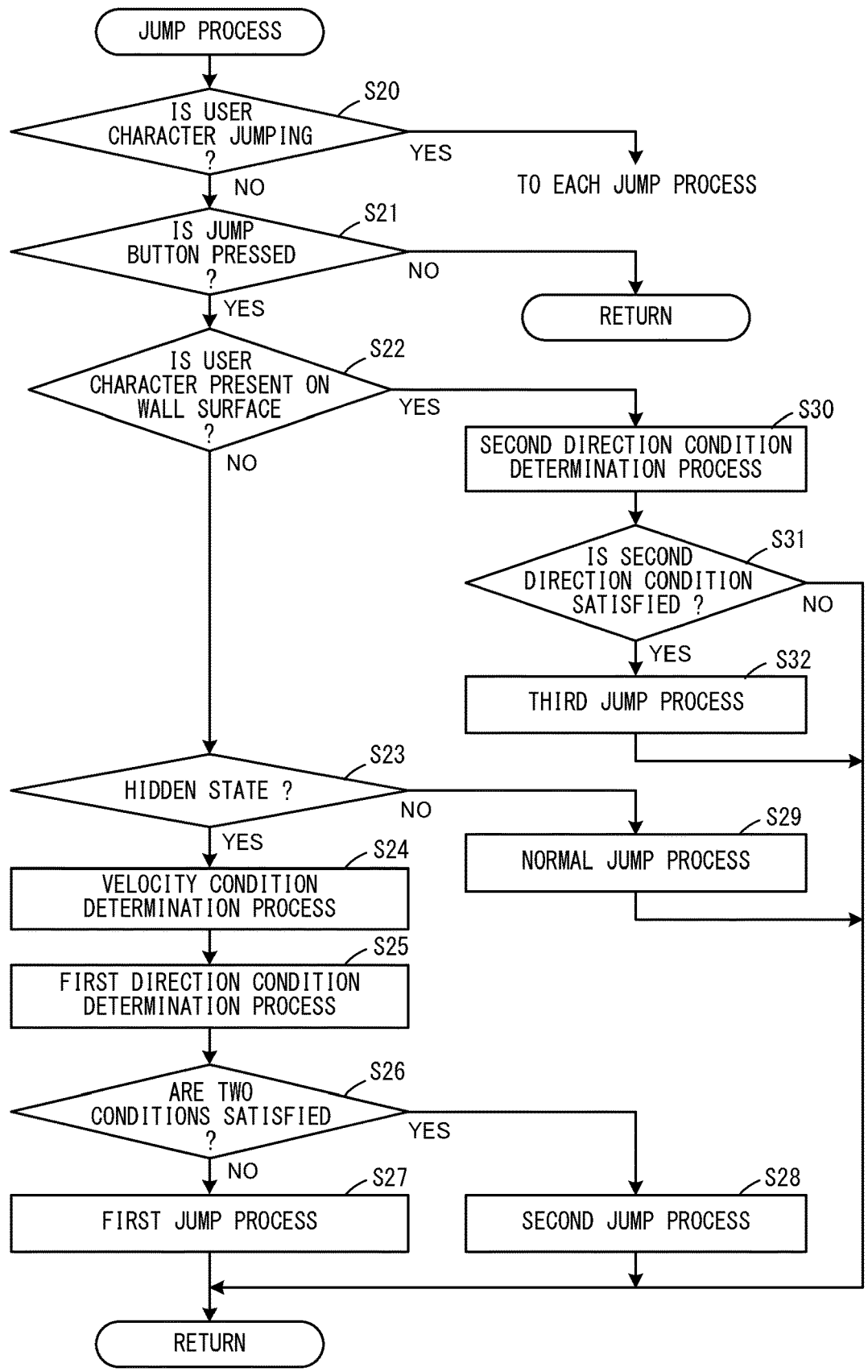
FIG. 30 is a flow chart showing an example non-limiting jump process in step S8.

Next, the details of the jump process in step S8 are described. FIG. 30 is a flow chart showing an example of the jump process in step S8.

In step S20, the processor 81 determines whether or not the user character P is in the state where the user character P is jumping. Here, if the user character P is jumping by a first jump process in step S27, a second jump process in step S28, a third jump process in step S32 or S63, a normal jump process in step S29 or S54, or a fourth jump process in step S69 described below, the determination is YES. If the determination is NO in step S20, next, the process of step S21 is performed. If the determination is YES in step S20, the processing transitions to each jump process that is being executed (the first jump process, the second jump process, the third jump process, the normal jump process, or the fourth jump process). Even if the user character P is not in the state where the user character P is jumping by each jump process, but if the user character P is present in the air, the determination is YES in step S20. In this case, the processing does not transition to each jump process that is being executed (the first jump process, the second jump process, the third jump process, the normal jump process, or the fourth jump process), and the jump process shown in FIG. 30 ends.

In step S21, based on the operation data, the processor 81 determines whether or not the jump button (e.g., the B-button 54) is pressed. If the determination is YES in step S21, next, the process of step S22 is performed. If the determination is NO in step S21, the jump process shown in FIG. 30 ends.

In step S22, the processor 81 determines whether or not the user character P is present on the wall surface. Specifically, the processor 81 determines whether or not the angle between a surface on which the user character P is located and the XZ-plane is greater than or equal to a predetermined value (e.g., 60 degrees). If the determination is NO in step S22, next, the process of step S23 is performed. If the determination is YES in step S22, next, the process of step S30 is performed.

In step S23, the processor 81 determines whether or not the user character P is in the hidden state. Specifically, the processor 81 determines whether or not the user character P is in the special state and located on the first state area 201. If the determination is YES in step S23, next, the process of step S24 is performed. If the determination is NO in step S23, next, the process of step S29 is performed.

In step S24, the processor 81 executes a velocity condition determination process. Specifically, the processor 81 determines whether or not the maximum value of the moving velocity of the user character PB during the predetermined period (the period from the current moment to the time a predetermined number of frames before) exceeds the first threshold. If the maximum value of the moving velocity of the user character PB during the predetermined period exceeds the first threshold, the velocity condition is satisfied. The DRAM 85 stores the velocity vectors of the user character PB in a predetermined number of frames in the past. Based on these velocity vectors, it is determined whether or not the velocity condition is satisfied. After step S24, step S25 is executed.

In step S25, the processor 81 executes a first direction condition determination process. Here, based on the difference between the moving direction of the user character PB during the predetermined period and a direction set by the latest direction operation input, the first direction condition determination process is performed. Specifically, if the angle between a direction indicated by a velocity vector having the maximum moving velocity during the predetermined period and the direction set by the latest direction operation input is greater than or equal to the second threshold, the processor 81 determines that the first direction condition is satisfied. Here, "the direction set by the latest direction operation input" is a direction in the virtual space set based on the input direction of the analog stick 32 included in the latest operation data (the direction of the input vector) and is calculated based on the latest input direction and the direction of the line of sight of the virtual camera. If the analog stick 32 continues to be tilted in the same direction, the user character PB moves in "the direction set by the latest direction operation input". After step S25, steps S26 is executed.

In step S26, the processor 81 determines whether or not both the two conditions (the velocity condition and the first direction condition) are satisfied. If at least either one of the two conditions is not satisfied (step S26: NO), next, the process of step S27 is executed. If both the two conditions are satisfied (step S26: YES), next, the process of step S28 is executed.

In step S27, the processor 81 performs the first jump process. The first jump process is a process for causing the user character PB to perform the first jump action. If the first jump process is started in accordance with the fact that the determination is NO in step S26, the user character PB changes to the state where the user character PB is jumping by the first jump process. Then, the determination will be YES in the above step S20 in the next processing loop. Thus, the first jump process is executed for a plurality of frame times (e.g., until the user character PB falls to the ground or sticks to the wall surface). Here, if a direction operation input is provided with the pressing of the jump button, the moving direction of the user character PB is calculated by a method similar to that in the movement process in the above step S7, and the jump action (a movement upward in the virtual space) is performed. If a direction operation input is not provided, only the jump action is performed. While the user character PB is moving, and if the input to the same direction continues, the processor 81 causes the user character PB to jump in the moving direction. While the user character PB is not moving, and if a direction operation input is not provided, the processor 81 causes the user character PB to jump in the up direction in the virtual space. After step S27, the process shown in FIG. 30 ends.

In step S28, the processor 81 performs the second jump process. The second jump process is a process for causing the user character PB to perform the second jump action. If the second jump process is started in accordance with the fact that the determination is YES in step S26, the user character PB changes to the state where the user character PB is jumping by the second jump process. Then, the determination will be YES in the above step S20 in the next processing loop. Thus, the second jump process is executed for a plurality of frame times (e.g., until the user character PB falls to the ground or sticks to the wall surface). Here, the user character PB is moving relatively fast in the first direction, and a direction operation input for moving the user character PB in the second direction is provided. In this case, the processor 81 moves the user character PB in the second direction, which is a direction along the ground, and also causes the user character PB to jump in the up direction in the virtual space. Specifically, based on a direction operation input included in the acquired operation data, the processor 81 calculates an after-change-of-direction velocity vector and rewrites the current velocity vector of the user character PB as the calculated after-change-of-direction velocity vector. The after-change-of-direction velocity vector is calculated based on a vector in the second direction relating to the direction operation input and a vector in the up direction relating to the pressing of the jump button. The magnitude of the after-change-of-direction velocity vector is the same as the magnitude of the current velocity vector of the user character PB (the velocity vector before the change of direction). Consequently, the user character PB immediately changes direction to the second direction and also jumps. That is, unlike the first jump process, the user character PB does not decrease the velocity in the first direction over a plurality of frame times and then move in the second direction, but immediately (in one frame time) changes the moving direction to the second direction and also jumps. The magnitude of the moving velocity after the change of direction is maintained at the magnitude of the moving velocity before the change of direction.

In a case where the second jump process is performed again by the time when a predetermined time elapses since the second jump process has ended, the moving velocity of the user character PB after the change of direction is decreased. Specifically, in a case where the second jump process is executed after the predetermined time elapses since the second jump process has previously ended, a velocity vector having the same magnitude as that of the current velocity vector of the user character PB is calculated as an after-change-of-direction velocity vector. In a case where the second jump process is executed again within the predetermined time, a velocity vector having a value obtained by multiplying the magnitude of the current velocity vector of the user character PB by a predetermined attenuation rate is calculated as an after-change-of-direction velocity vector.

In the second jump process in step S28, the processor 81 sets the user character PB to the attack influence reduction state for a predetermined time (e.g., 10 to 20 frame times). While the user character P is set to the attack influence reduction state, and if the user character P returns to the normal state, the attack influence reduction state ends before the predetermined time elapses.

If, on the other hand, the user character P is not in the hidden state, in step S29, the processor 81 performs the normal jump process. The normal jump process in step S29 is executed if the user character P is in the normal state or if the user character P is in the special state and is present on an area in the initial state or the second state. If the normal jump process is started in accordance with the fact that the determination is NO in step S23, the user character PB changes to the state where the user character PB is jumping by the normal jump process. Then, the determination will be YES in the above step S20 in the next processing loop. Thus, the normal jump process is executed for a plurality of frame times (e.g., until the user character P falls to the ground). Here, if the user character P is not moving, a jump action for moving the user character P upward in the virtual space is performed. If the user character P is moving, a process related to a change of direction similar to the movement process in step S7 is performed, and the jump action is performed.

If, on the other hand, the user character PB is present on the wall surface, in step S30, the processor 81 performs a second direction condition determination process. Here, it is determined whether or not the user character PB is located on the wall surface, and a direction operation input to a direction away from the wall surface is provided. Specifically, based on a normal vector of the wall surface on which the user character PB is located, and an input vector of the analog stick 32, it is determined whether or not the second direction condition is satisfied. More specifically, a two-dimensional normal vector is calculated, and it is determined whether or not the angle between the calculated two-dimensional normal vector and the input vector is less than or equal to a threshold (e.g., 60 degrees). After step S30, steps S31 is executed.

In step S31, the processor 81 determines whether or not the second direction condition is satisfied. If the determination is YES in step S31, next, the process of step S32 is performed. If the determination is NO in step S31, the process shown in FIG. 30 ends.

In step S32, the processor 81 performs the third jump process. If the third jump process is started in accordance with the fact that the determination is YES in step S31, the user character PB changes to the state where the user character PB is jumping by the third jump process. Then, the determination will be YES in the above step S20 in the next processing loop. Thus, the third jump process is executed for a plurality of frame times (e.g., until the user character P falls to the ground). Here, the processor 81 causes the user character PB to perform the third jump action. If the user character PB is moving in the first direction on the wall surface, the movement in the first direction is not decelerated, and the user character PB immediately starts moving in a direction away from the wall surface object 210. In the third jump process, the processor 81 sets the user character PB to the attack influence reduction state for a predetermined time (e.g., 10 to 20 frame times). After step S32, the process shown in FIG. 30 ends.

Wall Climbing Process

Figure 31:
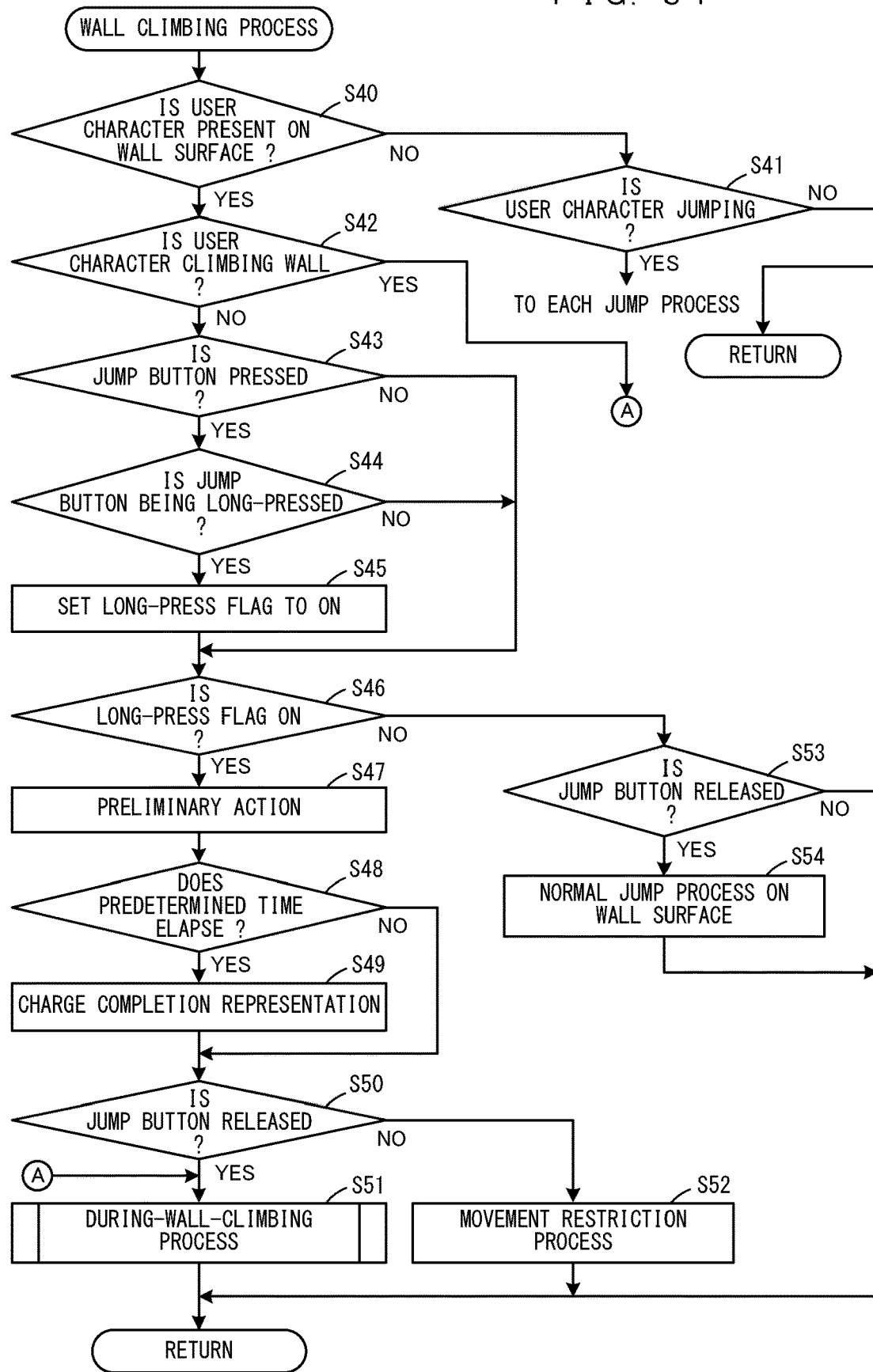
FIG. 31 is a flow chart showing an example non-limiting wall climbing process in step S9.

Next, the details of the wall climbing process in step S9 are described. FIG. 31 is a flow chart showing an example of the wall climbing process in step S9.

In step S40, the processor 81 determines whether or not the user character PB is present on the wall surface. If the determination is YES in step S40, next, the process of step S42 is performed. If the determination is NO in step S40, next, the process of step S41 is performed.

In step S41, the processor 81 determines whether or not the user character P is in the state where the user character P is jumping. Here, if the user character P is jumping by the first jump process in step S27, the second jump process in step S28, the third jump process in step S32 or S63, the normal jump process in step S29 or S54, or the fourth jump process in step S69, the determination is YES. If the determination is NO in step S41, the wall climbing process shown in FIG. 31 ends. If the determination is YES in step S41, the processing transitions to each jump process that is being executed (the first jump process, the second jump process, the third jump process, the normal jump process, or the fourth jump process). Even if the user character P is not in the state where the user character P is jumping by each jump process, but if the user character P is present in the air, the determination is NO in step S41.

In step S42, the processor 81 determines whether or not the user character PB is performing the wall climbing action. Specifically, the processor 81 determines whether or not a during-wall-climbing flag described below is ON. If the determination is NO in step S42, next, the process of step S43 is performed. If the determination is YES in step S42, next, the process of step S51 is performed.

In step S43, the processor 81 determines whether or not the jump button is pressed. If the determination is YES in step S43, next, the process of step S44 is performed. If the determination is NO in step S43, next, the process of step S46 is performed.

In step S44, the processor 81 determines whether or not the jump button is being long-pressed. Specifically, the processor 81 determines whether or not a predetermined time elapses since the pressing of the jump button has been started. If the determination is YES in step S44, next, the process of step S45 is performed. If the determination is NO in step S44, next, the process of step S46 is performed.

In step S45, the processor 81 sets a long-press flag to ON. The long-press flag is set to ON when the jump button is being long-pressed, and is set to OFF when the jump button is not being long-pressed. After step S45, next, the process of step S46 is performed.

In step S46, the processor 81 determines whether or not the long-press flag is ON. If the determination is YES in step S46, next, the process of step S47 is performed. If the determination is NO in step S46, next, the process of step S53 is performed.

In step S47, the processor 81 causes the user character PB to perform the preliminary action. Consequently, the user character PB changes to a preliminary action form. During the preliminary action, the visibility of the user character PB becomes high on the display device of the user relating to the user character PB, and the visibility of the user character PB becomes high also on the display device of a user of the user's team and the display device of an opponent user. After step S47, next, the process of step S48 is performed.

In step S48, the processor 81 determines whether or not a predetermined time (e.g., 30 to 60 frame times) elapses since the preliminary action has been started. If the determination is YES in step S48, next, the process of step S49 is performed. If the determination is NO in step S48, next, the process of step S50 is performed.

In step S49, the processor 81 performs the charge completion representation. For example, an effect image indicating that charging is completed is displayed, or a sound effect is output. The charge completion representation may be performed only once at the time when the predetermined time elapses since the preliminary action has been started, or may be continuously performed during the long-pressing of the jump button after the predetermined time elapses. After step S49, next, the process of step S50 is performed.

In step S50, the processor 81 determines whether or not the jump button is released. If the jump button is released, the determination of the processor 81 is YES in step S50. If the determination is YES in step S50, the processor 81 sets the long-press flag to OFF and next executes the process of step S51. If the determination is NO in step S50, next, the process of step S52 is performed.

In step S51, the processor 81 performs a during-wall-climbing process. The process of step S51 is a process for causing the user character PB to perform the wall climbing action. In the during-wall-climbing process, while a direction operation input to the up direction is being provided, the user character PB moves in the up direction on the wall surface. The details of the during-wall-climbing process in step S51 will be described below. After step S51, the wall climbing process shown in FIG. 31 ends.

In step S52, the processor 81 performs a movement restriction process. Here, the movement of the user character PB is restricted during the preliminary action. For example, if a direction operation input is provided using the analog stick 32, and when the preliminary action is being performed, the moving velocity of the user character PB is slower than when the preliminary action is not being performed. Consequently, even during the preliminary action, it is possible to adjust the position of the user character PB on the wall surface. During the preliminary action, the moving velocity of the user character PB is made slow, whereby it is possible to facilitate the adjustment of the position. If the preliminary action is not being performed, and a direction operation input is not provided, the user character PB automatically moves downward in the virtual space under the influence of gravity. During the preliminary action, however, the downward movement due to gravity is also restricted.

Specifically, in accordance with the time elapsed since the preliminary action has been started, the moving velocity of the user character PB when a direction operation input is provided becomes slow. After the charge completion representation is performed, the moving velocity of the user character PB is at a minimum. Even if the charge completion representation is performed, but if a direction operation input is provided, the position of the user character PB is adjusted. In accordance with the time elapsed since the preliminary action has been started, the fall velocity due to gravity becomes slow. After the charge completion representation is performed, the user character PB does not fall due to gravity, and remains at the current position on the wall surface. After the charge completion representation is performed, and even if a direction operation input is provided, the user character PB may not move on the wall surface. After the charge completion representation is performed, the user character PB may slightly move downward under the influence of gravity. After step S52, the wall climbing process shown in FIG. 31 ends.

If, on the other hand, the long-press flag is OFF, in step S53, the processor 81 determines whether or not the jump button is released. If the jump button is released, the determination of the processor 81 is YES in step S53. If the determination is YES in step S53, next, the process of step S54 is performed. If the determination is NO in step S53, the wall climbing process shown in FIG. 31 ends.

In step S54, the processor 81 performs the normal jump process on the wall surface. If the normal jump process on the wall surface is started in accordance with the fact that the determination is YES in step S53, the user character PB changes to the state where the user character PB is jumping by the normal jump process on the wall surface. Then, the determination will be YES in the above step S41 in the next processing loop. Thus, the normal jump process on the wall surface is executed for a plurality of frame times. Consequently, the state where the user character PB jumps on the wall surface is displayed. Specifically, the user character PB moves upward by a predetermined distance along the wall surface or temporarily at a distance from the wall surface. The process of step S54 is executed if the jump button is pressed and released in a short time when the user character PB is present on the wall surface. That is, if the jump button is released before the long-pressing of the jump button is detected, the process of step S54 is executed, and the user character PB jumps along the wall surface or temporarily at a distance from the wall surface. In a case where the user character PB is present at the boundary between the first state area 201 and another area, and if the process of step S54 is performed, the user character PB may jump beyond the boundary. The height of the jump, however, is lower than the height at which the user character PB jumps beyond the boundary in the during-wall-climbing process in step S51. When the user character PB is present on the wall surface, and if the jump button is pressed, and if the second direction condition is satisfied, the third jump process is performed. If, however, the second direction condition is not satisfied, the normal jump process on the wall surface is performed in step S54. In the third jump process, as described above, the user character PB immediately jumps in a direction away from the wall surface. In the normal jump process on the wall surface in step S54, however, the user character PB jumps along the wall surface while sticking to the wall surface or temporarily at a distance from the wall surface, and returns onto the wall surface again. In step S54, if a direction operation input involving a change of direction is provided with the pressing of the jump button, similarly to the above step S7, a process related to a change of direction is performed. That is, when the user character PB is moving in the first direction, and if a direction operation input for moving the user character PB in the second direction is provided, and if the second direction condition is not satisfied, the process of step S54 is performed. Then, the user character PB changes direction to the second direction over one or more frame times. After step S54, the wall climbing process shown in FIG. 31 ends.

During-Wall-Climbing Process

Figure 32:
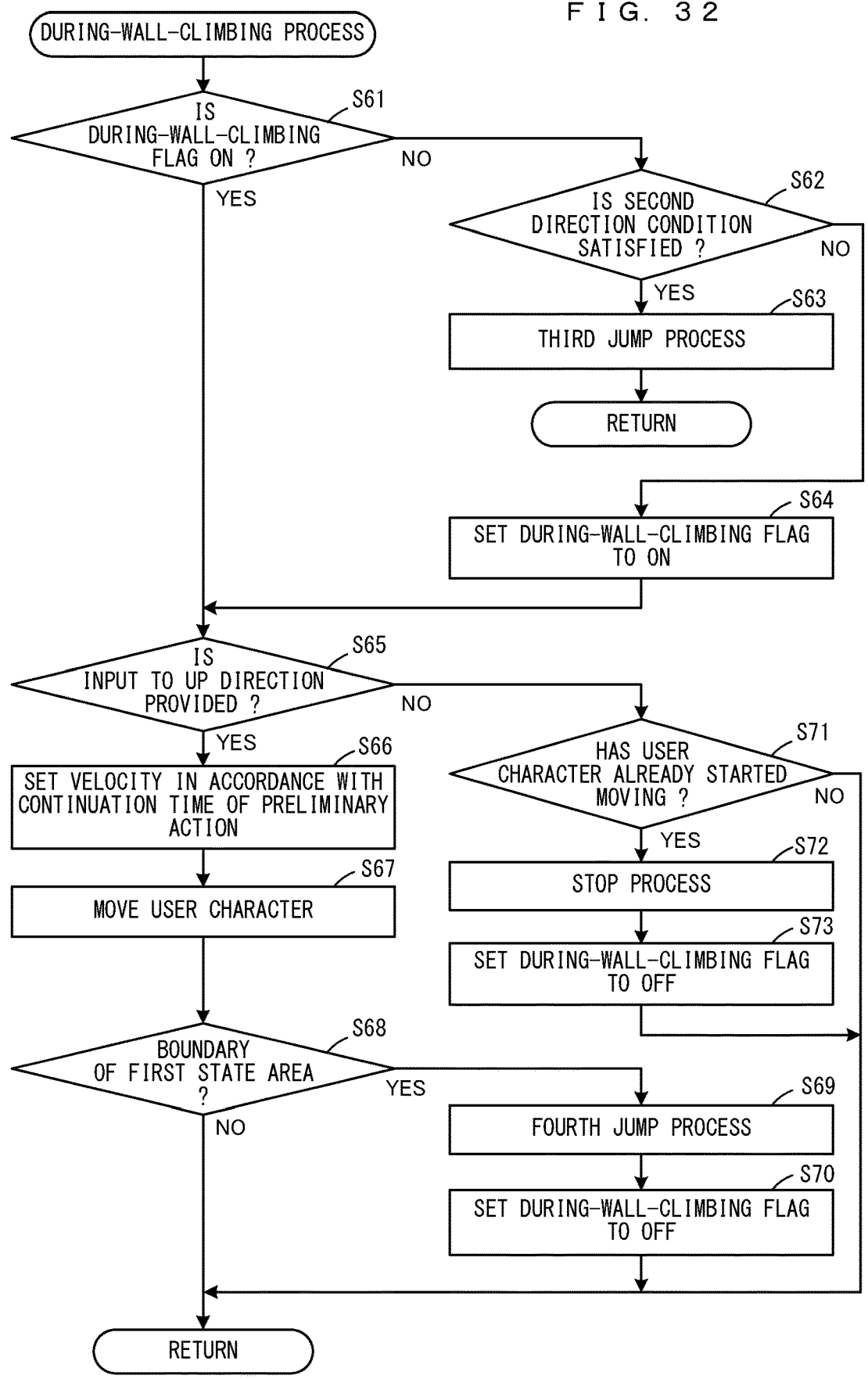
FIG. 32 is a flow chart showing an example non-limiting during-wall-climbing process in step S51.

Next, the details of the during-wall-climbing process in step S51 in FIG. 31 are described. FIG. 32 is a flow chart showing an example of the during-wall-climbing process in step S51.

In step S61, the processor 81 determines whether or not a during-wall-climbing flag is ON. The during-wall-climbing flag is a flag that is set to ON in step S64 described below. The during-wall-climbing flag is set to OFF at default. If the determination is NO in step S61, next, the process of step S62 is performed. If the determination is YES in step S61, next, the process of step S65 is performed.

In step S62, the processor 81 determines whether or not the second direction condition is satisfied. Here, a determination similar to that in the above step S31 is made. That is, it is determined whether or not a direction operation input to a direction away from the wall surface is provided when the user character PB is located on the wall surface. If the determination is YES in step S62, next, the process of step S63 is performed. If the determination is NO in step S62, next, the process of step S64 is performed.

In step S63, the processor 81 performs the third jump process. Here, a process similar to that of the above step S32 is performed. After step S63, the during-wall-climbing process shown in FIG. 32 ends. If the third jump process is started in accordance with the fact that the determination is YES in step S62, the user character PB changes to the state where the user character PB is jumping by the third jump process. Then, the determination will be YES in the above step S20 in the next processing loop. Thus, the third jump process is executed for a plurality of frame times (e.g., until the user character P falls to the ground).

In step S64, the processor 81 sets the during-wall-climbing flag to ON. After step S64, next, the process of step S65 is performed.

The processes of the above steps S62 to S64 are executed only once when the long-pressing of the jump button is released. When the long-pressing of the jump button is released, and if a direction operation input satisfying the second direction condition is provided (step S62: YES), the third jump process is performed. Consequently, the user character PB jumps in a direction away from the wall surface, and the processes of step S65 and the subsequent steps are not performed. On the other hand, when the long-pressing of the jump button is released, and if the second direction condition is not satisfied (step S62: NO), the during-wall-climbing flag is set to ON (step S64), and the processes of step S65 and the subsequent steps are performed. While the during-wall-climbing flag is set to ON, the processes of step S65 and the subsequent steps are repeatedly performed.

In step S65, the processor 81 determines whether or not a direction operation input to the up direction is provided using the analog stick 32. Specifically, the processor 81 determines whether or not a component (a y-component) in the up direction of an input vector of the analog stick 32 has a positive value. If the determination is YES in step S65, next, the process of step S66 is performed. If the determination is NO in step S65, next, the process of step S71 is performed.

In step S66, the processor 81 sets the moving velocity of the user character PB in accordance with the continuation time of the preliminary action. Specifically, the processor 81 sets the moving velocity such that the longer the continuation time of the preliminary action (the time in which the long-pressing of the jump button continues) is, the faster the moving velocity is. After the charge completion representation is performed, the second velocity, which is the maximum velocity, is set. Since a velocity relating to the continuation time of the preliminary action before the jump button is released is set, the moving velocity of the user character PB is maintained while the input to the up direction continues. After step S66, next, the process of step S67 is performed.

In step S67, the processor 81 moves the user character PB at the velocity set in step S66. Consequently, if the user character PB has not yet started moving on the wall surface, the user character PB starts moving. If the user character PB has already started moving on the wall surface, the user character PB continuously moves. The moving direction of the user character PB is set to a direction relating to the input direction of the analog stick 32. For example, if the charge completion representation is performed, the user character PB moves at the second velocity. If the charge completion representation is not performed, the user character PB moves at the velocity relating to the continuation time of the preliminary action. If the input direction of the analog stick 32 changes, in step S67, the moving direction of the user character PB also changes. Consequently, during the wall climbing action, it is possible to change the moving direction of the user character PB. After step S67, next, the process of step S68 is performed.

In step S68, the processor 81 determines whether or not the user character PB reaches the boundary between the first state area 201 on the wall surface and another area. For example, if the user character PB reaches the boundary between the first state area 201 on the wall surface and the second state area 202 on the wall surface, the determination is YES in step S68. If the user character PB reaches the boundary between the first state area 201 on the wall surface and the initial state area 203 on the wall surface, the determination is YES in step S68. Also if the user character PB reaches an end of the wall surface (the boundary between the wall surface and a surface other than the wall surface (e.g., the upper surface 220 in FIG. 26)), the determination is YES in step S68. If the determination is YES in step S68, next, the process of step S69 is performed. If the determination is NO in step S68, the during-wall-climbing process shown in FIG. 32 ends.

In step S69, the processor 81 performs the fourth jump process for causing the user character PB to perform the fourth jump action. For example, if the above charge completion representation is performed, the user character PB swiftly jumps from the boundary of the first state area 201. The initial velocity at this time is the second velocity, which is the maximum velocity. The direction of the jump at this time is the direction relating to the input direction of the analog stick 32. If the fourth jump action is performed, the user character PB is set to the attack influence reduction state for a predetermined time (e.g., 40 to 50 frame times). In a case where the long-pressing of the jump button is released before the above charge completion representation is performed, and if the user character PB reaches the boundary, the user character PB jumps from the boundary (the fourth jump action) and is also set to the attack influence reduction state. In this case, the user character P only jumps to a position lower than the highest point when the charge completion representation is performed. If a velocity relating to the time of the preliminary action is less than a predetermined value, the user character PB may not jump from the boundary. In this case, the user character PB may not be set to the attack influence reduction state. After step S69, next, the process of step S70 is performed.

In step S70, the processor 81 sets the during-wall-climbing flag to OFF. After step S70, the during-wall-climbing process shown in FIG. 32 ends.

If, on the other hand, the input of the up direction ends, in step S71, the processor 81 determines whether or not the user character PB has already started moving on the wall surface. Here, after the during-wall-climbing flag is ON, the process of step S67 is performed, whereby it is determined whether or not the user character PB is already moving on the wall surface. If the determination is YES in step S71, next, the process of step S72 is performed. If the determination is NO in step S71, the during-wall-climbing process shown in FIG. 32 ends.

In step S72, the processor 81 performs a stop process for stopping the wall climbing action of the user character PB. Consequently, the user character PB is decelerated and is stopped after the lapse of a predetermined time. After step S72, next, the process of step S73 is performed.

In step S73, the processor 81 sets the during-wall-climbing flag to OFF. After step S73, the during-wall-climbing process shown in FIG. 32 ends. In a case where the jump button is pressed during the wall climbing action, and if a direction operation input satisfying the second direction condition is provided, the determination is NO in step S65. In this case, in step S72, the third jump process is performed, and the user character PB performs the third jump action in a direction away from the wall.

The above processing is merely illustrative, and for example, the thresholds for the determinations used in the steps may be changed, or the order of the steps may be changed. Further, another step may be added to the above steps, or some of the above steps may be omitted.

As described above, when the user character PB is in the hidden state on the ground, and if the jump button is pressed (step S23: YES), and if the velocity condition and the first direction condition are satisfied, the second jump process is performed (step S28). If at least either one of the velocity condition and the first direction condition is not satisfied, the first jump process is performed (step S27). The velocity condition is likely to be satisfied in a case where the user character PB is moving at a fast velocity during a predetermined period immediately before the jump button is pressed. Specifically, the velocity condition is satisfied in a case where the user character PB is moving at a velocity faster than the first threshold. The first direction condition is likely to be satisfied when the user character PB is moving in the first direction, and in a case where a direction operation input for moving the user character PB in the second direction is provided, and if the difference between the first direction and the second direction is great. Specifically, the first direction condition is satisfied in a case where the difference between the first direction and the second direction is greater than the second threshold. In a case where the second jump process is performed, the user character PB completes a change of direction to the second direction faster than in a case where the first jump process is performed, and also jumps. In a case where the second jump process is performed, the moving velocity of the user character PB after the change of direction is relatively faster than in a case where the first jump process is performed.

As described above, in the exemplary embodiment, when the user character PB is moving at a fast velocity, it is possible to cause the user character PB to quickly change direction by the second jump action. Consequently, it is possible to improve the operability of the user character PB. In a case where the user character PB is moving at high speed and involves a great change of direction, the second jump action is performed. Thus, it is possible to urge the positive movement of the user character PB in the hidden state. For example, it is possible to move the user character PB at high speed toward the enemy character and also make it easy to avoid the attack of the enemy character. Then, the user character is caused to perform a wide variety of motions, whereby it is possible to improve the interest of the game. When the user character PB changes to the exposed state by a jump, the second jump action is performed. Thus, it is possible to prevent the user character PB from becoming too advantageous and maintain and improve the interest of the game.

In the exemplary embodiment, if the second jump action is performed, the user character PB changes to the attack influence reduction state. In the attack influence reduction state, the disadvantageous influence when the user character PB is attacked by the enemy character EC is reduced. Consequently, it is possible to motivate the user to perform the second jump action. The attack influence reduction state continues only for a short time in a case where the second jump action is performed. Thus, it is possible to prevent the user character PB from becoming too advantageous.

In the exemplary embodiment, in a case where the second jump action is performed in succession within a predetermined time, the moving velocity of the user character PB after the change of direction is slower than in a case where the second jump action is not performed in succession. That is, if the second jump action is performed, the user character PB moves at a certain velocity after the change of direction. Then, if the second jump action is performed again within the predetermined time, the user character PB moves at a velocity slower than the certain velocity after the change of direction. Consequently, it is possible to prevent the user character PB from becoming too advantageous.

In the exemplary embodiment, when the user character PB is present on the wall surface, and if the jump button is pressed (if the jump button is short-pressed) (step S22: YES), and if the second direction condition is satisfied, the third jump process for causing the user character PB to jump in a direction away from the wall surface is performed (step S32). In the third jump process, even if the user character PB is moving in the first direction, the user character PB immediately changes direction and jumps in a direction away from the wall surface. Consequently, even when the user character PB is present on the wall surface, it is possible to cause the user character PB to quickly jump in a direction away from the wall surface. Thus, for example, it is possible to make it easy to avoid the attack of the enemy character.

In the exemplary embodiment, even if the difference between the first direction and the second direction is 90 degrees, the first direction condition is satisfied, and the second jump process is performed. That is, even if a direction operation input to a direction in which the user character PB advances in a direction immediately lateral to the moving direction is provided with an input to the jump button, the second jump process is performed. Consequently, it is possible to immediately change direction to an immediately lateral direction.

The faster the moving velocity of the user character PB during a predetermined period immediately before the jump button is pressed is, the smaller the difference between the first direction and the second direction for satisfying the first direction condition may be.

In the exemplary embodiment, when the user character PB is present on the wall surface, and if the jump button is long-pressed, the preliminary action is performed during the long-press (step S47). Then, in accordance with the release of the jump button, the wall climbing action is performed (step S51). During the wall climbing action, while the input to the up direction continues, the user character PB continues to move at a velocity relating to the continuation time of the preliminary action on the wall surface (steps S66 and S67). If the preliminary action is performed for a predetermined time, and when the user character PB reaches the boundary of the first state area 201 on the wall surface, the user character PB performs the fourth jump action from the boundary (step S69).

Consequently, it is possible to cause the user character PB to largely jump beyond the boundary of the first state area 201 on the wall surface. It is possible to diversify the movement of the user character on the wall surface and improve the interest of the game.

In the exemplary embodiment, while the user character PB is performing the preliminary action, and if a direction operation input is provided, the position of the user character PB on the wall surface is adjusted in accordance with the direction operation input (step S52). Specifically, in accordance with the time elapsed since the preliminary action has been started, the moving velocity of the user character PB when the direction operation input is provided becomes slow. Consequently, it is possible to adjust the start position of the wall climbing action. During the preliminary action, the moving velocity of the user character PB becomes slow. Thus, it is possible to make it easy for the user to adjust the position of the user character PB.

In the exemplary embodiment, after the long-pressing of the jump button ends, and while the direction operation input to the up direction continues, the user character PB continues to move on the first state area 201 on the wall surface (step S67). If the direction operation input to the up direction ends, the movement also ends (step S71). While the direction operation input to the up direction continues, the moving velocity of the user character PB is maintained (step S66). Consequently, after the wall climbing action starts, it is possible to continue or end the wall climbing action. The direction operation input to the up direction is continued, whereby it is possible to maintain the moving velocity of the user character PB to the boundary of the first state area 201 and cause the user character PB to jump from the boundary while maintaining the velocity. Consequently, it is possible to cause the user character PB to jump from the boundary.

In the exemplary embodiment, in accordance with a direction operation input, the moving direction of the user character PB is changed during the wall climbing action (step S67). If the direction operation input satisfies a predetermined condition, the movement of the user character PB is stopped (step S72). Specifically, if the input to the up direction ceases to be provided (step S65: NO), the movement of the user character PB by the wall climbing action is stopped. Consequently, during the wall climbing action, in accordance with a direction operation input, it is possible to change or stop the moving direction of the user character PB.

In the exemplary embodiment, when the user character PB is moved on the first state area 201 in accordance with a direction operation input, the user character PB is displayed in a first display form of which the visibility is low. While the user character PB is caused to perform the preliminary action, the user character PB is displayed in a second display form (a preliminary action form) of which the visibility is higher than that in the first display form. Thus, during the preliminary action, the user character PB is easy for another user to visually confirm and is likely to be attacked by the opponent. Consequently, it is possible to prevent the user from becoming too advantageous over the opponent by the wall climbing action and maintain the balance of the game.

In the exemplary embodiment, the height of the jump of the user character PB differs in accordance with the time of the preliminary action. Specifically, in accordance with the time of the preliminary action, the moving velocity of the user character PB during the wall climbing action becomes fast, and the velocity of the user character PB when the user character PB reaches the boundary of the first state area 201 becomes fast. Thus, as a result, the longer the time of the preliminary action is, the higher the height of the jump of the user character PB beyond the boundary is. Consequently, the longer the preliminary action is, the higher the user character PB can be caused to jump.

In the exemplary embodiment, in a case where the user character PB is present on the wall surface, and if a direction operation input is not provided, the user character PB automatically moves downward in the virtual space due to gravity. In a case where the preliminary action is performed, this automatic downward movement is restricted (step S52). Consequently, during the preliminary action, it is possible to maintain the position of the user character PB on the wall surface and improve convenience.

In the exemplary embodiment, if the user character PB reaches the boundary of the first state area 201 by the wall climbing action and the fourth jump action is performed, the user character PB changes to the attack influence reduction state (step S69). In the attack influence reduction state, the disadvantageous influence when the user character PB is attacked by the enemy character EC is reduced. Consequently, it is possible to motivate the user to perform the wall climbing action. The attack influence reduction state continues only for a short time in a case where the fourth jump action is performed. Thus, it is possible to prevent the user character PB from becoming too advantageous.

In the exemplary embodiment, during the preliminary action, if the jump button is released and a direction operation input satisfying the second direction condition is provided, the third jump action is performed (step S63). During the wall climbing action, also if the jump button is pressed and a direction operation input satisfying the second direction condition is provided, the third jump action is performed. Consequently, even during the preliminary action or during the wall climbing action, if a predetermined operation input is provided, it is possible to cause the user character PB to jump in a direction away from the wall surface.

In the exemplary embodiment, the moving velocity of the user character PB when the user character PB moves on the wall surface by the wall climbing action can be made faster than the moving velocity of the user character PB when the user character PB moves on the wall surface in accordance with a direction operation input. Consequently, it is possible to promote the movement by the wall climbing action. Thus, it is possible to vary the movement of the user character PB on the wall surface and improve the interest of the game.

In the exemplary embodiment, if the user character PB moves on the wall surface in accordance with a direction operation input, the user character PB does not move beyond the first state area 201 on the wall surface. If the user character PB moves on the wall surface by the wall climbing action, the user character PB jumps beyond the first state area 201 on the wall surface. Consequently, it is possible to vary the movement of the user character PB on the wall surface.

Variations

While the exemplary embodiment has been described above, the exemplary embodiment is not limited to the above, and may be modified as follows.

For example, in the above exemplary embodiment, in a case where the second jump action is performed, the user character is caused to immediately change direction, and the velocity after the change of direction is made relatively fast. In a case where the first jump action is performed, the user character is caused to change direction over a predetermined time, and the velocity after the change of direction is made relatively slow. Consequently, in a case where the second jump action is performed, the user character is caused to change direction more quickly than in a case where the first jump action is performed, and is also caused to jump. In another exemplary embodiment, for example, in a case where the first jump action is performed, the jump action may be performed with a change of direction for a first time. In a case where the second jump action is performed, the jump action may be performed with a change of direction for a second time shorter than the first time. As described above, in a case where the second jump action is performed, the time until a change of direction is made may be shorter than in a case where the first jump action is performed. For example, in a case where the first jump action is performed, the initial velocity of the user character after a change of direction may be a first velocity. In a case where the second jump action is performed, the initial velocity of the user character after a change of direction may be a second velocity faster than the first velocity. In a case where the first jump action is performed, after a change of direction, the user character may be accelerated at a first acceleration. In a case where the second jump action is performed, after a change of direction, the user character may be accelerated at a second acceleration greater than the first acceleration. As described above, in a case where the second jump action is performed, the moving velocity of the user character after a change of direction may be faster than in a case where the first jump action is performed.

In the above exemplary embodiment, in a case where an input to the jump button is provided, based on a direction operation input in the past before the time of the input and a direction operation input at the time of the input, it is determined whether or not the first direction condition is satisfied. In another exemplary embodiment, in a case where an input to the jump button is provided, based on a direction operation input in the past before the time of the input and a direction operation input after the time of the input, it may be determined whether or not the first direction condition is satisfied. In a case where an input to the jump button is provided, based on a direction operation input at the time of the input and a direction operation input after the time of the input, it may be determined whether or not the first direction condition is satisfied. That is, after an input to the jump button is provided, it may be determined whether or not a direction operation input to a direction different from the moving direction is provided. Then, if the result of the determination is affirmative, the second jump action may be performed.

In the above exemplary embodiment, based on the moving velocity and the moving direction of the user character during a predetermined period in the past from the time when an input to the jump button is provided, it is determined whether or not the second jump action is to be performed. The predetermined period may be one frame time at the time when the input to the jump button is provided.

In the above exemplary embodiment, it is determined whether or not an input to the jump button is provided. Then, if an input to the jump button is provided, it is determined whether or not the velocity condition is satisfied, and based on a direction operation input at the time of the input, it is also determined whether or not the first direction condition is satisfied. In another exemplary embodiment, the order of these determinations may be appropriately changed. For example, it may be determined whether or not a direction operation input satisfying the first direction condition is provided. Then, if the result of the determination is affirmative, it may be determined whether or not an input to the jump button is provided and whether or not the velocity condition is satisfied.

In the above exemplary embodiment, if the user character P is present on the ground (a surface parallel to or at an angle less than a predetermined angle to the XZ-plane), the second jump action is performed. If the user character P is present on the wall surface, the third jump action is performed. No matter which of the jump actions is performed, the moving velocity of the user character P after a change of direction is maintained at the moving velocity before the change of direction. In another exemplary embodiment, the moving velocity of the user character P after a change of direction may be constant without depending on the moving velocity before the change of direction. In this case, only in a case where the user character P is present on the wall surface, the moving velocity after the change of direction may be constant. The constant velocity may be the same as the second velocity, or may be faster than the second velocity, or may be slower than the second velocity. If, on the other hand, the user character P is present on the ground, the moving velocity of the user character P after a change of direction may depend on the moving velocity before the change of direction.

In the above exemplary embodiment, in the virtual space, the ground object 200 and the upper surface 220 parallel to the XZ-plane are present, and the wall surface object 210 perpendicular to the XZ-plane is present. In another exemplary embodiment, in addition to these objects, the surfaces of various terrain objects may be placed, and each of the surfaces of the terrain objects may be changed to the first state or the second state by an operation input provided by the user. On a terrain object, a wall surface at an angle greater than or equal to a predetermined value (e.g., 60 degrees) to the XZ-plane may be placed, and the user character may perform the wall climbing action on the wall surface.

In the above exemplary embodiment, after the long-pressing of the jump button is released, and while a direction operation input to the up direction continues, the wall climbing action continues. In another exemplary embodiment, the wall climbing action may be started in accordance with the release of the long-pressing of the jump button, and even if a direction operation input is not provided, the user character may move to the boundary of the first state area 201 on the wall surface.

In the above exemplary embodiment, during the wall climbing action, a velocity relating to the time of the preliminary action is maintained. In another exemplary embodiment, the moving velocity during the wall climbing action may change. For example, the user character may be accelerated during the wall climbing action. In this case, the longer the time of the preliminary action is, the greater the acceleration during the wall climbing action may be.

In the above exemplary embodiment, the user character PB hides in liquid, thereby changing to the hidden state. The user character PB jumps, thereby changing to the exposed state. The state of the user character is not limited to these, and the user character may change to a hidden state and a non-hidden state. The hidden state may not be limited to the state where the user character is hidden in liquid so long as the user character is difficult for another user to visually confirm.

In the above exemplary embodiment, while a predetermined operation input continues, the user character is set to the special state. In another exemplary embodiment, even if a predetermined operation input is not continued, the user character may be set to the special state. For example, in a case where the user character is located on the first state area 201, the user character may be set to the special state.

In the above exemplary embodiment, if the second jump process and the third jump process are performed, a change of direction is immediately completed, and the user character changes to the attack influence reduction state. That is, while the user character is moving in the first direction, and if a direction operation input for making a change of direction to the second direction is provided with the pressing of the jump button, the velocity is not decreased in the first direction for a certain time, but is immediately changed to "0", and the user character is moved in the second direction. In another exemplary embodiment, if the second jump process and/or the third jump process are performed, the velocity may be decreased in the first direction for a certain time, and the user character may be set to the attack influence reduction state. That is, in another exemplary embodiment, if the second jump process is performed, a change of direction may not be immediately made, and the user character may be set to the attack influence reduction state. If the first jump process is performed, a change of direction may not be immediately made, and the user character may not be set to the attack influence reduction state.

The processes in the above flow charts are merely illustrative. For example, a part of the jump process may be executed in the wall climbing process. A part of the wall climbing process may be executed in the jump process. For example, a process on the wall surface and a process on the ground may be divided, the processing may branch into the third jump process in the process on the wall surface, and may branch into the second jump process in the process on the ground. As described above, the jump process shown in FIG. 30 and the wall climbing process shown in FIG. 31 may be dispersed into several processes.

In the above exemplary embodiment, a multiplay game is performed by a plurality of users. In another exemplary embodiment, a game may be performed by a single user. In this case, an enemy character is controlled by a CPU. The above game is merely illustrative, and the control of the above characters may be applied to another game other than the exemplified game.

The above game program may be executed by any other information processing apparatus (e.g., a smartphone, a tablet terminal, a personal computer, a server, or the like). The game program may be executed by an information processing system including a plurality of apparatuses. The above processes may be dispersedly executed by the plurality of apparatuses.

The configurations of the above exemplary embodiment and its variations can be optionally combined together unless they contradict each other. Further, the above description is merely an example of the exemplary embodiment, and may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein instructions that, when executed, cause a computer to execute game processing regarding a game performed in a three-dimensional virtual space including at least a terrain object, the game processing comprising:
in accordance with a first operation input provided by a user, changing a specified area in the terrain object to a first state;
based on a direction operation input provided by the user, performing a first movement process for moving a user character on an area in the first state in a wall surface as the terrain object;
in a case where the user character is present on the wall surface in the first state, and while a second operation input provided by the user continues, causing the user character to perform a preliminary action;
under the condition that at least the second operation input ends, performing a second movement process for moving the user character performing the preliminary action on the wall surface in the first state in a predetermined direction including at least a component in an up direction;
performing a game event having disadvantageous influence in the game on the user character; and
if the user character reaches a boundary between the wall surface in the first state and an area in the virtual space that is different from the wall surface in the first state due to the movement by the second movement process, reducing the disadvantageous influence by the game event.

2. The non-transitory computer-readable storage medium according to claim 1, wherein the game processing further comprises:
if the direction operation input is provided while the user character is caused to perform the preliminary action, adjusting a position of the user character on the wall surface in the first state in accordance with the direction operation input.

3. The non-transitory computer-readable storage medium according to claim 2, wherein
a moving velocity of the user character based on the adjustment is slower than the moving velocity of the user character based on the first movement process.

4. The non-transitory computer-readable storage medium according to claim 1, wherein
in the second movement process, after the second operation input ends, and while the direction operation input continues, the user character is moved on the wall surface in the first state.

5. The non-transitory computer-readable storage medium according to claim 1, wherein
in the second movement process,
a moving direction of the user character is changed in accordance with the direction operation input, and if the direction operation input satisfies a predetermined condition, the movement of the user character is stopped.

6. The non-transitory computer-readable storage medium according to claim 1, wherein
in the first movement process, the user character is moved in a first display form, and
while the user character is caused to perform the preliminary action, the user character is displayed in a second display form having a visibility higher than a visibility of the first display form.

7. The non-transitory computer-readable storage medium according to claim 1, wherein the game processing further comprises:
as a result of the second movement process, if the user character reaches the boundary, causing the user character to jump from the boundary
a height of the jump of the user character differs in accordance with time of the preliminary action.

8. The non-transitory computer-readable storage medium according to claim 1, wherein
a moving velocity of the user character based on the second movement process differs in accordance with time of the preliminary action.

9. The non-transitory computer-readable storage medium according to claim 8, wherein
in the second movement process, after the second operation input ends, and while the direction operation input continues, the moving velocity of the user character relating to the time of the preliminary action is maintained.

10. The non-transitory computer-readable storage medium according to claim 1, wherein the game processing further comprises:
in a case where the user character is present on the wall surface in the first state, and if the direction operation input is not provided, performing a third movement process for automatically moving the user character in a down direction in the virtual space; and
if the user character is caused to perform the preliminary action, reducing the movement by the third movement process.

11. The non-transitory computer-readable storage medium according to claim 1, wherein the game processing further comprises:
if a third operation input is provided by the user while the user character is caused to perform the preliminary action or during the movement by the second movement process, causing the user character to jump in a direction away from the wall surface.

12. The non-transitory computer-readable storage medium according to claim 1, wherein
a moving velocity of the user character is faster in the movement by the second movement process than in the movement by the first movement process.

13. The non-transitory computer-readable storage medium according to claim 1, wherein
if the user character reaches the boundary due to the movement by the second movement process, the user character performs the jump beyond the boundary, and
if the user character reaches the boundary due to the movement by the first movement process, and even if the user character jumps beyond the boundary, a height of the jump is lower than a height of the jump due to the movement by the second movement process.

14. The non-transitory computer-readable storage medium according to claim 1, wherein
the game event is an attack of an enemy character in the virtual space.

15. An information processing apparatus comprising:
a processor and a memory storing executable instructions that, when executed, cause the processor to execute game processing comprising:
executing game processing regarding a game performed in a three-dimensional virtual space including at least a terrain object;
in accordance with a first operation input provided by a user, changing a specified area in the terrain object to a first state;
based on a direction operation input provided by the user, performing a first movement process for moving a user character on an area in the first state in a wall surface as the terrain object;
in a case where the user character is present on the wall surface in the first state, and while a second operation input provided by the user continues, causing the user character to perform a preliminary action;
under the condition that at least the second operation input ends, performing a second movement process for moving the user character performing the preliminary action on the wall surface in the first state in a predetermined direction including at least a component in an up direction;
performing a game event having disadvantageous influence in the game on the user character; and
if the user character reaches a boundary between the wall surface in the first state and an area in the virtual space that is different from the wall surface in the first state due to the movement by the second movement process, reducing the disadvantageous influence by the game event.

16. An information processing system comprising:
a processor and a memory storing executable instructions that, when executed, cause the processor to execute game processing comprising:
executing game processing regarding a game performed in a three-dimensional virtual space including at least a terrain object;
in accordance with a first operation input provided by a user, changing a specified area in the terrain object to a first state;
based on a direction operation input provided by the user, performing a first movement process for moving a user character on an area in the first state in a wall surface as the terrain object;
in a case where the user character is present on the wall surface in the first state, and while a second operation input provided by the user continues, causing the user character to perform a preliminary action;
under the condition that at least the second operation input ends, performing a second movement process for moving the user character performing the preliminary action on the wall surface in the first state in a predetermined direction including at least a component in an up direction;
performing a game event having disadvantageous influence in the game on the user character;
if the user character reaches a boundary between the wall surface in the first state and an area in the virtual space that is different from the wall surface in the first state due to the movement by the second movement process, reducing the disadvantageous influence by the game event.

17. An information processing method performed by an information processing system for executing game processing regarding a game performed in a three-dimensional virtual space including at least a terrain object, the information processing method comprising:
- in accordance with a first operation input provided by a user, changing a specified area in the terrain object to a first state;
- based on a direction operation input provided by the user, performing a first movement process for moving a user character on an area in the first state in a wall surface as the terrain object;
- in a case where the user character is present on the wall surface in the first state, and while a second operation input provided by the user continues, causing the user character to perform a preliminary action;
- under the condition that at least the second operation input ends, performing a second movement process for moving the user character performing the preliminary action on the wall surface in the first state in a predetermined direction including at least a component in an up direction;
- performing a game event having disadvantageous influence in the game on the user character; and
- if the user character reaches a boundary between the wall surface in the first state and an area in the virtual space that is different from the wall surface in the first state due to the movement by the second movement process, reducing the disadvantageous influence by the game event.

* * * * *